United States Patent
Matsubara

(10) Patent No.: US 7,751,586 B2
(45) Date of Patent: Jul. 6, 2010

(54) IMAGE PROCESSING APPARATUS, IMAGE PROCESSING METHOD, AND COMPUTER PRODUCT

(75) Inventor: Akio Matsubara, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 956 days.

(21) Appl. No.: 11/241,178

(22) Filed: Sep. 29, 2005

(65) Prior Publication Data

US 2006/0067561 A1  Mar. 30, 2006

(30) Foreign Application Priority Data

Sep. 29, 2004 (JP) ............................. 2004-284491
Aug. 12, 2005 (JP) ............................. 2005-234919

(51) Int. Cl.
*G06K 9/00* (2006.01)

(52) U.S. Cl. ..................................... 382/100

(58) Field of Classification Search ........................ None
See application file for complete search history.

(56) References Cited

U.S. PATENT DOCUMENTS

| | | | |
|---|---|---|---|
| 6,101,284 A | 8/2000 | Matsubara et al. | |
| 6,519,351 B2 * | 2/2003 | Kimura et al. | 382/100 |
| 6,748,533 B1 * | 6/2004 | Wu et al. | 713/176 |
| 6,934,403 B2 * | 8/2005 | Joo et al. | 382/100 |
| 7,092,545 B2 * | 8/2006 | Seo et al. | 382/100 |
| 7,181,069 B2 * | 2/2007 | Yamada | 382/232 |
| 7,209,571 B2 * | 4/2007 | Davis et al. | 382/100 |
| 7,343,025 B2 * | 3/2008 | Seo et al. | 382/100 |
| 7,457,431 B2 * | 11/2008 | Shi et al. | 382/100 |
| 2002/0057843 A1 | 5/2002 | Matsubara | |
| 2002/0180997 A1 * | 12/2002 | Rozzi | 358/1.9 |
| 2003/0068089 A1 | 4/2003 | Sano et al. | |
| 2004/0146206 A1 | 7/2004 | Matsubara | |
| 2004/0151387 A1 | 8/2004 | Sakuyama et al. | |
| 2005/0058353 A1 | 3/2005 | Matsubara | |
| 2005/0152006 A1 * | 7/2005 | Abe et al. | 358/3.28 |

FOREIGN PATENT DOCUMENTS

| | | |
|---|---|---|
| JP | HEI 10-84484 | 3/1998 |
| JP | 2001-186331 A | 7/2001 |
| JP | 2004-080175 A | 3/2004 |
| JP | 2004-236230 A | 8/2004 |
| JP | 2004-284491 | 9/2004 |

OTHER PUBLICATIONS

U.S. Appl. No. 10/317,911, filed Dec. 11, 2002, Sano.
U.S. Appl. No. 10/734,805, filed Dec. 11, 2003, Matsubara.
U.S. Appl. No. 11/028,514, filed Jan. 4, 2005, Matsubara.

* cited by examiner

*Primary Examiner*—Yuzhen Ge
(74) *Attorney, Agent, or Firm*—Blakely, Sokoloff, Taylor & Zafman LLP

(57) ABSTRACT

An image processing apparatus includes a determining unit that determines at least one embed area in an area that is not accessed by an application in an image. An embedding unit embeds at least one piece of embed information into the embed area. A quantizer quantizes the image embedded with the embed information. An encoder encodes the image quantized.

8 Claims, 38 Drawing Sheets

USED CODES

| VALUE (HEXADECIMAL) | BINARY CODE | GRAY CODE |
|---|---|---|
| 0 | 0 0 0 0 | 0 0 0 0 |
| 1 | 0 0 0 1 | 0 0 0 1 |
| 2 | 0 0 1 0 | 0 0 1 1 |
| 3 | 0 0 1 1 | 0 0 1 0 |
| 4 | 0 1 0 0 | 0 1 1 0 |
| 5 | 0 1 0 1 | 0 1 1 1 |
| 6 | 0 1 1 0 | 0 1 0 1 |
| 7 | 0 1 1 1 | 0 1 0 0 |
| 8 | 1 0 0 0 | 1 1 0 0 |
| 9 | 1 0 0 1 | 1 1 0 1 |
| A | 1 0 1 0 | 1 1 1 1 |
| B | 1 0 1 1 | 1 1 1 0 |
| C | 1 1 0 0 | 1 0 1 0 |
| D | 1 1 0 1 | 1 0 1 1 |
| E | 1 1 1 0 | 1 0 0 1 |
| F | 1 1 1 1 | 1 0 0 0 |

IMAGE → WAVELET TRANSFORM COEFFICIENT

HIERARCHICAL WAVELET TRANSFORM

MORE IMPORTANT INFORMATION IS EMBEDDED INTO HIGHER CODING PATH

LESS INFORMATION IS EMBEDDED INTO LOWER CODING PATH

SYSTEM B

SYSTEM A

IMAGE PROCESSING APPARATUS, IMAGE PROCESSING METHOD, AND COMPUTER PRODUCT The present application claims priority to and incorporates by reference the entire contents of Japanese priority documents, 2004-284491 filed in Japan on Sep. 29, 2004 and 2005-234919 filed in Japan on Aug. 12, 2005.

BACKGROUND OF THE INVENTION

1. Field of the Invention

The present invention relates to a technology for embedding information into image information.

2. Description of the Related Art

Following operations are generally carried out in an image processing application.

1. Encoding of an image
2. Recording and storing of specific information of the code Generally, the specific information in the operation above is handled as management information based on the operation above, as much as possible. For example, according to the International Standard (IS) 15444-1(Joint Photographic Experts Group (JPEG) 2000 Part1), an image encoding system concerning the above 1 is prescribed by the following eight items, and these items correspond to Annex A to Annex H, respectively.

a. Code stream syntax
   b. Order of image and compressed image data
   c. Arithmetic entropy encoding
   d. Coefficient bit modeling
   e. Quantization
   f. Discrete wavelet transform of a tile component
   g. Direct current (DC) level shift and plural component transform
   h. Encoding of an image having an area of interest On the other hand, the above 2 is prescribed by the Annex I as follows.

i. JP2 file format

One example of specific information included in the above i is a display area of an image. A vertical size and a horizontal size of a display area are prescribed by pixels using HEIGHT and WIDTH of elements defined as Image Header box in I.5.3.1.

Other box information is also used to record and store specific information of a code. A further detailed explanation is prescribed in the IS15444-1(JPEG2000 Part1) Annex I.

Techniques for embedding certain information into information such as an image to be encoded are conventionally known. See, for example, Japanese Patent Application Laid-Open No. H10-84484. The following three methods of embedding information are generally known.

A first method of embedding information is to embed information into an area that a user and each manufacturer can freely use in an optional marker segment, or a file format box or a field. When encoding and decoding are to be carried out among different manufacturers following the international standard, it is necessary to check data compatibility before and after the encoding and decoding in order to determine whether the encoding and decoding operations are consistent with the international standard specifications.

A marker segment prescribed by the international standard includes an essential marker segment that becomes a basis of determining whether the encoding and decoding are consistent with the international standard specification, and an optional marker segment into which each vendor can freely set information.

A com marker for comment is an example of an optional marker segment prescribed by the IS15444-1 (JPEG2000 Part1). A universal unique identifier (UUID) is available as a file format box.

These areas are not necessarily compatible. However, each vendor and each user can freely use these areas. For example, these areas are often used as areas for indicating a copyright notice of an image.

A second method of embedding information is to embed an electronic watermark into an image. When the image embedded with the electronic watermark is to be encoded, it is possible to effectively detect a tampering of a part of the image or a tampered position.

A third method of embedding information is to embed information using a mechanism of managing embed information separately from the image, and to access the embedded information through a route independent of that of the image information. Many vendors effectively use this method when there is no mechanism of embedding information in an encoding stream or when a server and a client can secure a route for exchanging information independent of the image.

However, the above three systems have many problems. In the first method, the embedded marker segment and the embedded file format box are not essential areas. When a particular manufacturer embeds information into an image at an encoding time, and then the image is expanded using an expander manufactured by a different manufacturer, edited, and compressed again, there is no guarantee that the optional marker segment and the optional box are stored.

Therefore, even when the code is expanded using an expander manufactured by the first manufacturer, the specific information embedded into the document at the beginning may be deleted, and the embed information may not be stored successfully in some cases.

The algorithm of the electronic watermark in the second method is not standardized between countries. Therefore, the algorithm is not compatible. Even when the embedded information is small, since the same information is redundantly embedded into the whole image at various positions to detect a tampering and a tampered position, the file needs to have a large size despite the small amount of embedded information.

In the third method, a mechanism of handling the embed information and the image information in a pair is essential. Therefore, the embedded information cannot be properly accessed with an expander that does not have this mechanism.

SUMMARY OF THE INVENTION

An image processing apparatus, image processing method, and computer product as described. In one embodiment, the image processing apparatus comprises a determining unit to determine at least one embed area in an area that is not accessed by an application in an image, an embedding unit to embed at least one piece of embed information into the embed area determined by the determining unit, and a quantizer to quantize the image embedded with the embed information; and encoder to encode the image quantized by the quantizer.

DETAILED DESCRIPTION OF THE PREFERRED EMBODIMENTS

Embodiments of the present invention solve at least one of the problems in the conventional technology.

According to an embodiment of the present invention, an image processing apparatus includes a determining unit that determines at least one embed area in an area that is not accessed by an application in an image, an embedding unit that embeds at least one piece of embed information into the embed area determined by the determining unit, a quantizer that quantizes the image embedded with the embed information, and an encoder that encodes the image quantized by the quantizer.

According to another embodiment of the present invention, a method includes determining at least one embed area in an area that is not accessed by an application in an image, embedding at least one piece of embed information into the embed area determined at the determining, quantizing the image embedded with the embed information, and encoding the image quantized at the quantizing.

According to still another embodiment of the present invention, a computer-readable recording medium stores therein a computer program that implements a method according to one embodiment of the present invention on a computer.

The other embodiments, features, and advantages of the present invention are specifically set forth in or will become apparent from the following detailed description of the invention when read in conjunction with the accompanying drawings.

Figure 1:
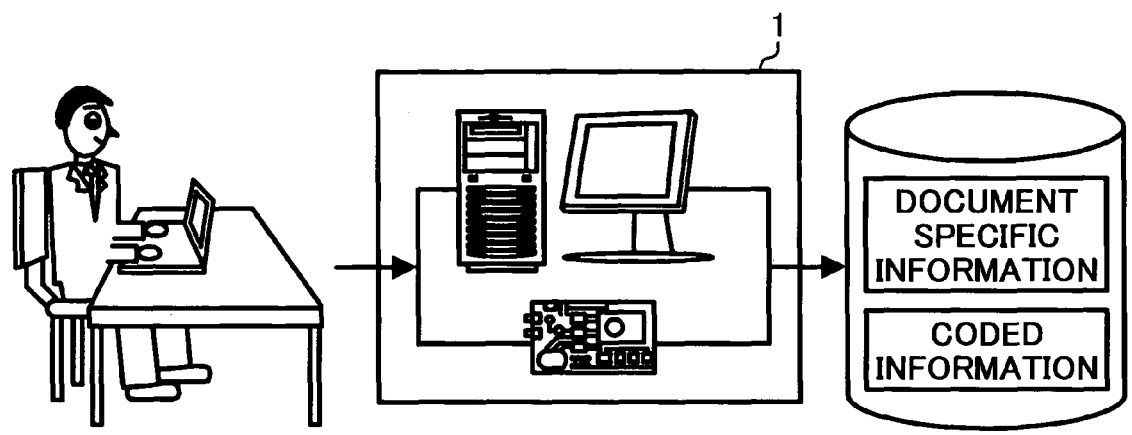
FIG. 1 is a diagram of an overall flow of operation carried out by an image input apparatus that includes an image processing apparatus.

FIG. 1 is a diagram of an overall flow of operation carried out by an image input apparatus 2000 (shown in FIG. 2) that includes an image processing apparatus 1. Examples of the image input apparatus 2000 are a scanner and a digital camera.

Figure 2:
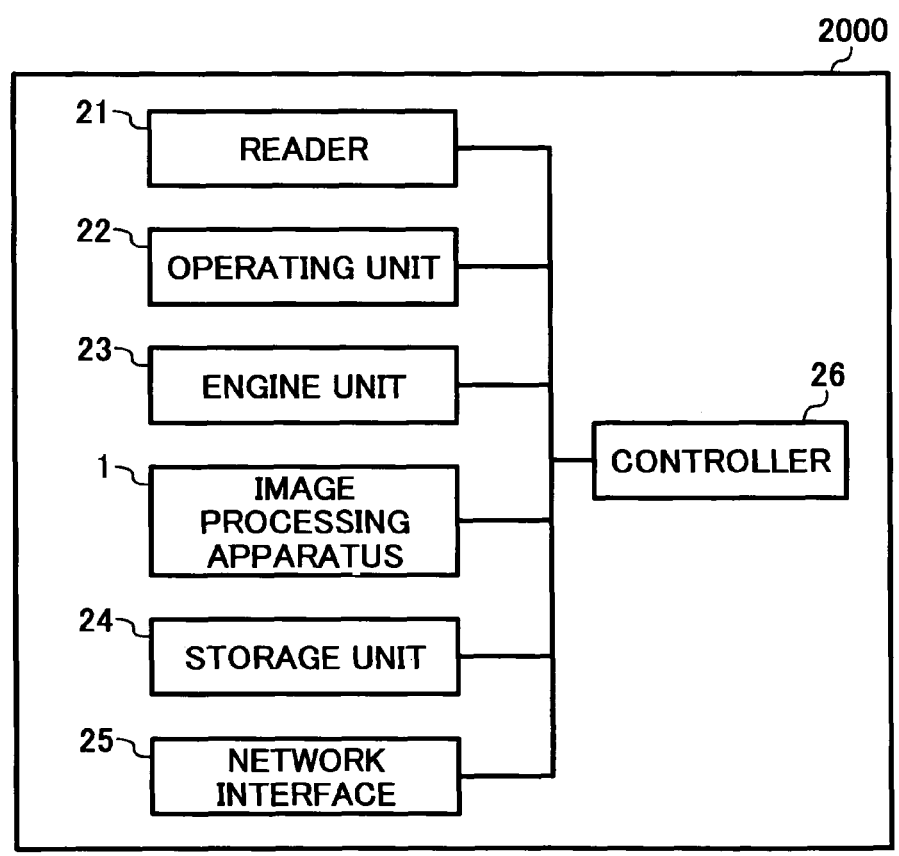
FIG. 2 is a block diagram of the image input apparatus shown in FIG. 1.

FIG. 2 is a diagram showing a configuration of the image input apparatus 2000. The image input apparatus 2000 includes a reader 21 that reads an image, an operating unit 22 that receives an operation from a user, an engine unit 23, the image processing apparatus 1 that processes the read image, a storage unit 24 that stores the image, a network interface 25, and a controller 26 that controls these units.

The operating unit 22 and the controller 26 of the image input apparatus 2000 can obtain the following document specific information separately from a read image.

a. Reading density set at the operating unit 22 of a scanner
b. An identification (ID) that identifies an image input apparatus
c. Time and date of reading the image A read image unit is managed and stored when necessary separately from compressing and encoding of the image within the image processing apparatus 1. The stored image information is expanded at a later date, and is drawn in a readable form. In this case, for example, a gamma value is corrected according to the "reading density" of the above a, and this corrected gamma value is used to accurately reproduce the image read by the scanner.

When application software for compression and application software for expansion are manufactured by the same manufacturer, information can be reproduced based on the specification prescribed in the application. However, when application software for compression and application software for expansion are manufactured by different manufacturers, the information cannot be reproduced unless there is a rule of reliably storing the information.

Information regarding compression and expansion, that is, the document specific information, is stored into a file when the file has a proper field. However, when there is no proper field or when a defined field is an optional field, the document specific information cannot be stored.

The following image relevant information is separately obtained from default set parameters with the reader 21 or the controller 26, and is stored as parameters that are necessary to encode the image.

A horizontal size of an image
A vertical size of an image
A density of an image
A horizontal size of tiling
A vertical size of tiling
A horizontal size of a code block
A vertical size of a code block The above parameters do not necessarily have to be stored, and can be obtained by inquiring another device that is connected online.

According to the IS15444-1, when an image is large, encoding is performed by a method called tiling to encode the image by dividing the image into independent units, or a method of dividing a wavelet transform coefficient into code blocks. In the IS15444-1, it is prescribed that a horizontal size and a vertical size of the image are indicated in a pixel unit or a coefficient unit using these methods. Whether to use the tiling method or the code block division method, and sizes thereof are set in advance into the controller 26.

A positional relationship between an image area, tiles, cells, and precincts explained in the IS15444-1(JPEG2000 Part1) is explained below.

Figure 3:
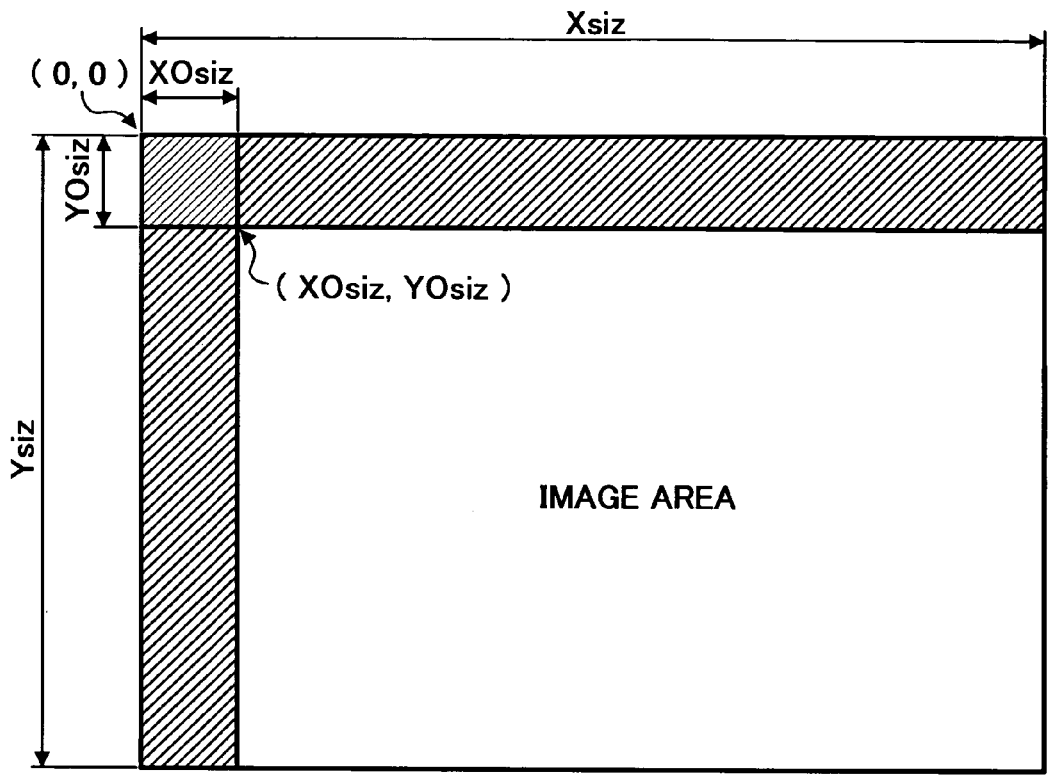
FIG. 3 depicts an image area specified by a reference grid.

In the JPEG2000, positions of an image, tiles, and the like are specified by a reference grid. The reference grid is represented by coordinate axes. FIG. 3 depicts an image area specified by a reference grid. The upper left coordinates of the image area are specified as a relative position of the origin (0, 0) of the reference grid on the upper left side. In other words, the upper left coordinates are (XOsiz, YOsiz).

The size of the actual image area is obtained from the following expression.

$$\text{Size of image area}=(Xsiz-XOsiz)\times(Ysiz-YOsiz) \quad (1)$$

The image area is not equal to the image size because a sampling interval on the reference grid relates to the image size.

Figure 4:
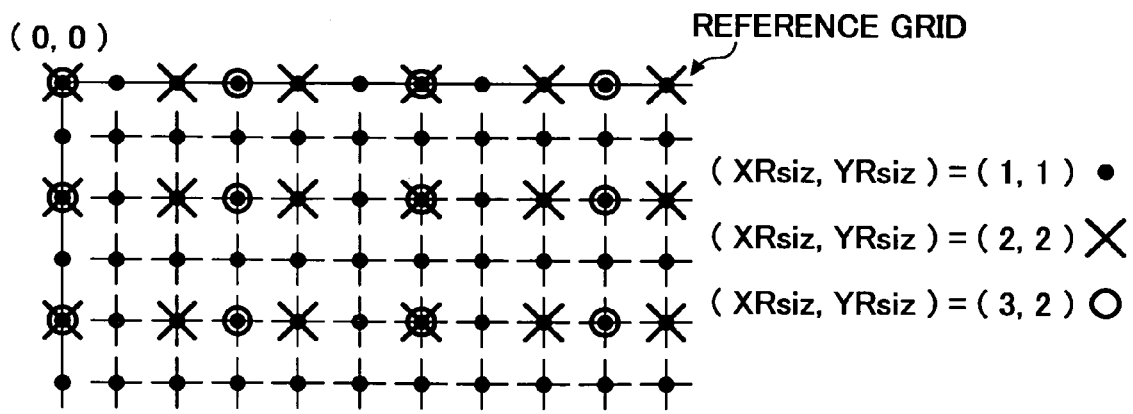
FIG. 4 is a schematic for illustrating a sampling interval.

FIG. 4 is an explanatory diagram of the sampling interval. Sampling intervals on the reference grid are expressed by parameters that express sampling intervals in a horizontal direction and a vertical direction called XRsiz and YRsiz, respectively. Since actual pixels are disposed using the sampling interval, sizes of the image are obtained from the following expression.

$$\text{Size in horizontal direction}=Xsiz/XRsiz-XOsiz/XRsiz$$

$$\text{Size in vertical direction}=Ysiz/YRsiz-YOsiz/YRsiz \quad (2)$$

Figure 5:
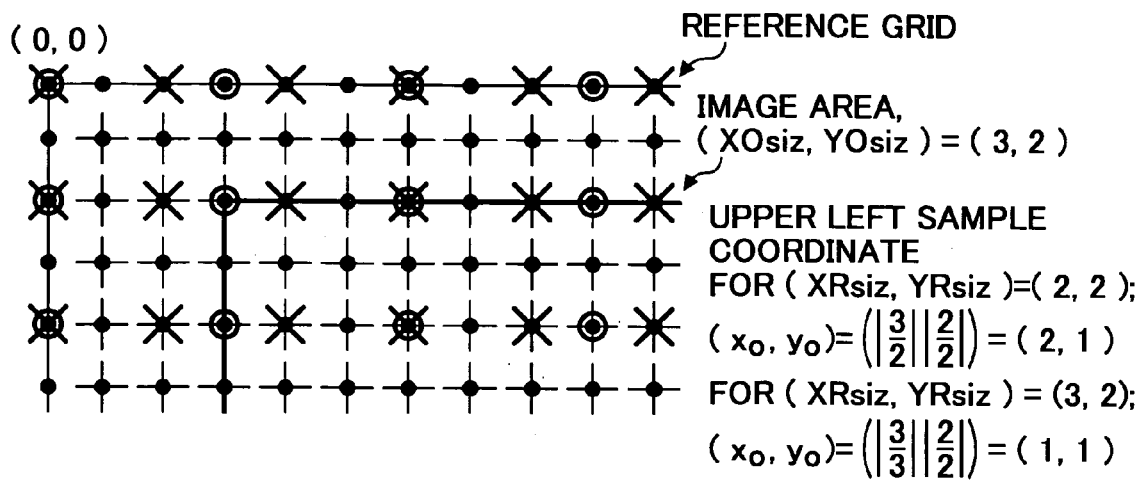
FIG. 5 is a schematic of a case in which an upper left sample position in an image area and a header image do not coincide with each other.

A header pixel of the image (a header pixel of a first line) is determined based on a relationship between the sampling interval and an offset position. Therefore, the upper left sample position in the image area does not necessarily become a header pixel. FIG. 5 is an example in which an upper left sample position in an image area and a header pixel do not coincide with each other.

Figure 6:
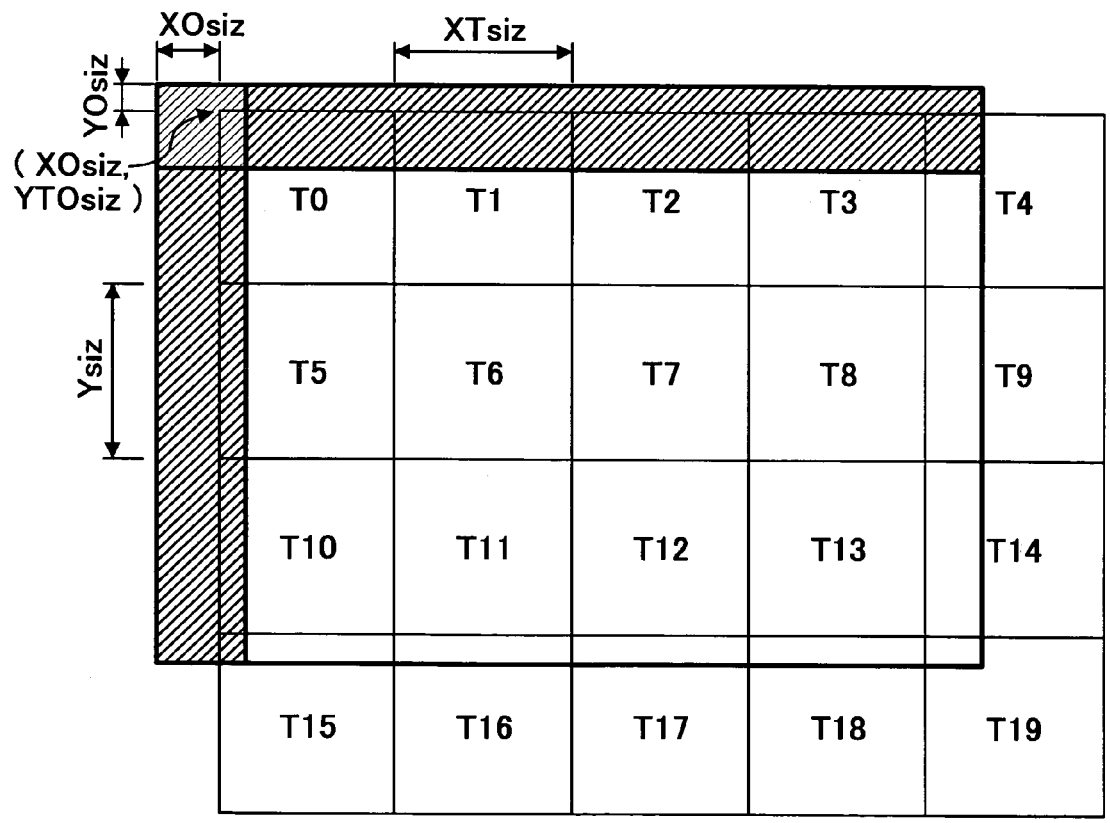
FIG. 6 depicts a positional relationship between the reference grid and tiles.

FIG. 6 depicts a positional relationship between the reference grid and tiles. An image disposed on the reference grid is divided into square areas called tiles when the image is encoded. The tiles must be individually encodable and decodable. Therefore, the pixel cannot be referred to beyond the tile boundary.

Positions of the tiles are specified by a relative position (XTOsiz, YTOsiz) of the origin of the reference grid and the upper left position of the first tile. An image offset position, a tile offset position, and a tile size have a relationship of the expression (3).

$$0 \leq XTOsiz \leq XOsiz \ o \leq YTOsiz \leq YOsiz$$

$$XTsiz+XTOsiz>XOsiz$$

$$YTsiz+YTOsiz>YOsiz \quad (3)$$

A total number of tiles can be obtained from the following expression.

$$\text{Number of tiles in horizontal direction}=(Xsiz-XTOsiz)/XTsiz$$

$$\text{Number of tiles in vertical direction}=(Ysiz-YTOsiz)/YTsiz \quad (4)$$

A cell is a unit of carrying out a wavelet transform of pixels within tiles. When a wavelet transform is carried out in cell units, a work area (a memory) at the time of the wavelet transform can be made small. A size of a cell is the same as the size of a tile, or is smaller than the size of the tile.

Although a pixel cannot be referred to beyond the tile boundary, the pixel can be referred to beyond a cell boundary because the cells are located within the tiles. However, according to the basic system, making reference to a sample beyond the cell boundary is not permitted. Therefore, although the memory can be decreased using the cells, image quality is deteriorated.

The expansion system supports pixel reference beyond cells. Therefore, in the expansion system, cells are effective means.

After an image is wavelet transformed, a horizontal size and a vertical size of the image become a half of those sizes of the image before the transform. In other words, the image is compressed. This compression processing can be achieved by dividing the image into small areas called precincts and encoding the image.

Figure 7:
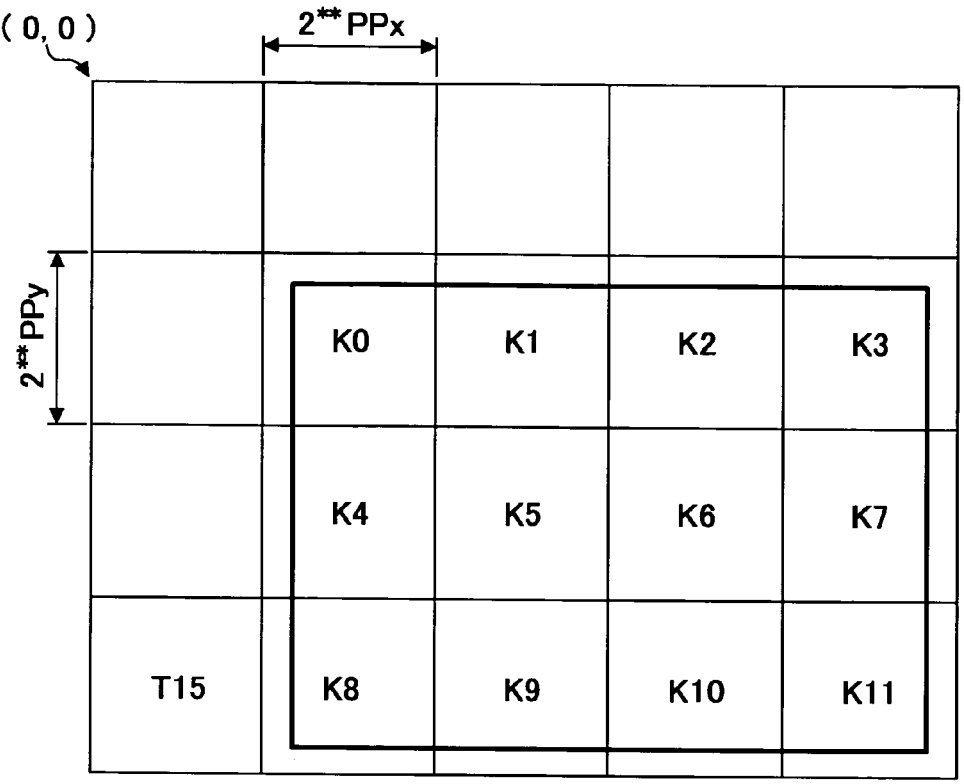
FIG. 7 depicts a positional relationship of precincts.

FIG. 7 depicts a positional relationship of precincts. The precincts are areas obtained by dividing an image into sizes of two to the power of PPx in a horizontal direction and two to the power of PPy in a vertical direction, using (0, 0) as the origin. In FIG. 7, K0 to K11 are precinct areas that are actually used.

Figure 8:
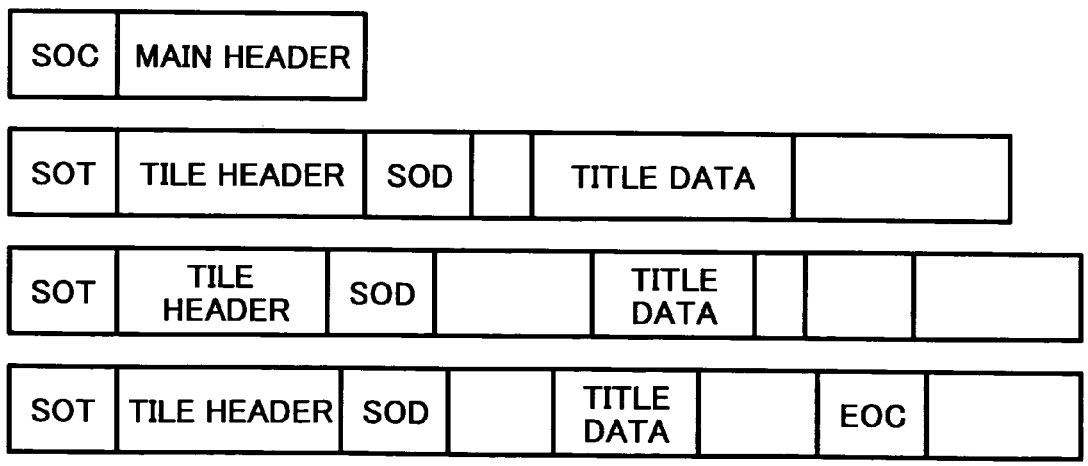
FIG. 8 is a schematic diagram of a code format according to the JPEG2000.

FIG. 8 is a schematic diagram of a code format according to the JPEG2000. A code format starts with a start of codestream (SOC) marker representing a start of a code data. A main header describing an encoding parameter and a quantization parameter follows the SOC marker, and actual code data follows the main header.

The actual code data starts with a start of tile-part (SOT) marker, and includes a tile header, a start of data (SOD) marker, and tile data (a code).

An end of codestream (EOC) marker representing the end of the code follows the code data which corresponds to the total image.

Figure 9:
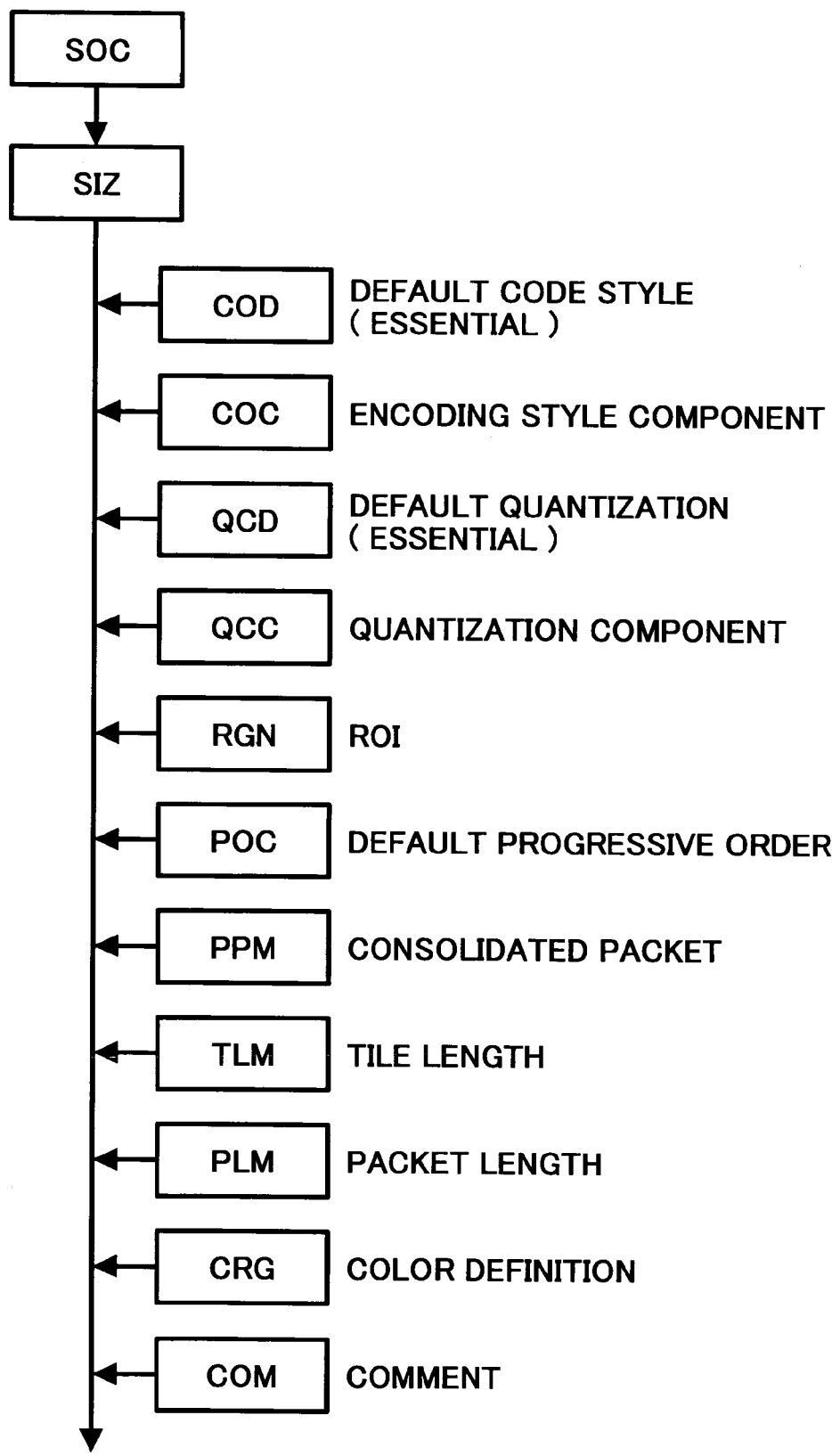
FIG. 9 is a configuration diagram of a main header.

FIG. 9 is a configuration diagram of the main header. The main header includes essential marker segments of a COD (a default code style) and a QCD (a default quantization), and optional marker segments of a COC (an encoding style component), a QCC (a quantization component), a RGN (a region of interest (ROI)), a POC (a default progressive order), a PPM (a consolidated packet), a TLM (a tile length), a PLM (a packet length), a CRG (a color definition), and a COM (comment).

Figure 10:
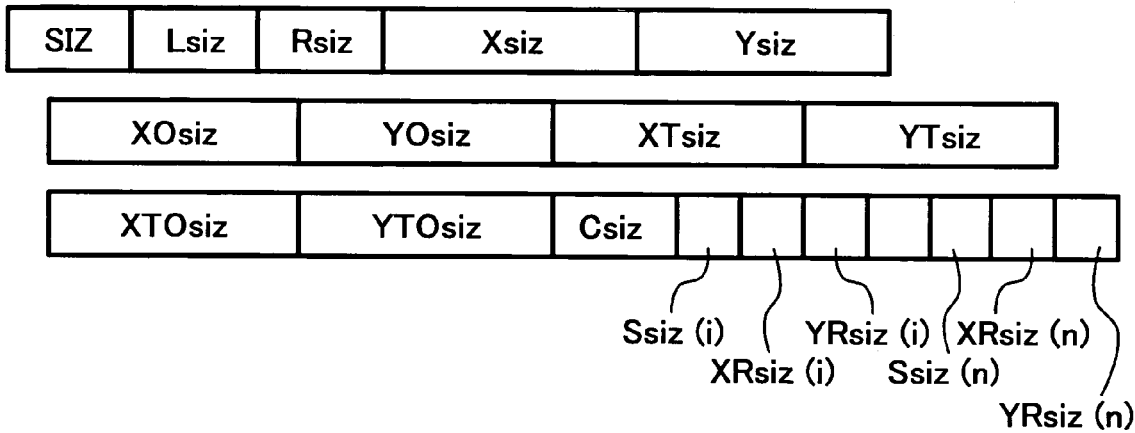
FIG. 10 is a configuration diagram of an SIZ marker segment.

The image relevant information is written into a size (SIZ) marker segment. The SIZ marker segment is added immediately after the SOC marker. A marker segment length depends on the number of components. FIG. 10 is a configuration diagram of the SIZ marker segment. Table 1 shows contents of the SIZ marker segment.

TABLE 1

Contents of SIZ marker segment

| Parameter | Size (bits) | Values | |
|---|---|---|---|
| SIZ | 16 | 0xff51 | |
| Lsiz | 16 | 41-49190 | Size of marker segment |
| Rsiz | 16 | 0 | Shows compatibility of coding string Fixed to zero Other than zero is reserved |
| Xsiz | 32 | 1~(2**32-1) | Size in horizontal direction of reference grids |
| Ysiz | 32 | 1~(2**32-1) | Size in vertical direction of reference grids |
| XOsiz | 32 | 0~(2**32-2) | Offset position of image in horizontal direction from origin of reference grids |
| YOsiz | 32 | 0~(2**32-2) | Offset position of image in vertical direction from origin of reference grids |
| XTsiz | 32 | 1~(2**32-1) | Size of tiles in horizontal direction |
| YTsiz | 32 | 1~(2**32-1) | Size of tiles in vertical direction |
| XTOsiz | 32 | 0~(2**32-2) | Offset position of tile in horizontal direction from origin of reference grids |
| YTOsiz | 32 | 0~(2**32-2) | Offset position of tile in vertical direction from origin of reference grids |
| Csiz | 16 | 1~16384 | Numberof components Number of bits and number of encoded bits in (i)-th component Number of bits before RCT/ICT |
| Ssiz(i) | 8 | 0 × 00~0 × 26 (0xa6) | Maximum number of bits is 38 When bit of highest order is zero, value has no code, and when bit of highest order is one, value has code Other values are reserved |
| XRsiz (i) | 8 | 1~255 | Number of samples in horizontal direction in (i)-th component |
| YRsiz (i) | 8 | 1~255 | Number of samples in vertical direction in (i)-th component |

Figure 11:
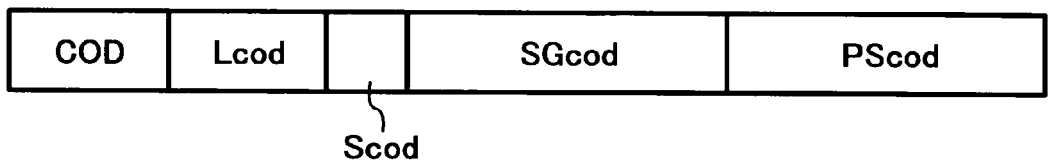
FIG. 11 is a configuration diagram of a COD marker segment.

A code block size is recorded in the default code style marker segment (COD). This is an essential marker describing a default code style. When tiles are divided into plural tiles, the marker is added to a head tile. A marker length depends on the length of Scod. FIG. 11 is a configuration diagram of the COD marker segment. Tables 2 to 10 show contents of the COD marker segment.

TABLE 2

Contents of COD marker segment

| Parameter | Size (bits) | Values | |
|---|---|---|---|
| COD | 16 | 0xff52 | |
| Lcod | 16 | 12~45 | Size of marker segment |
| Scod | 8 | Table 8 | Code style in all components |

TABLE 2-continued

Contents of COD marker segment

| Parameter | Size (bits) | Values | |
|---|---|---|---|
| Sgcod | 32 | Table 9 | Parameter of code style not depending on component |
| SPcod | variable | Table 10 | Parameter of code style relevant to component |

TABLE 3

Contents of Scod

| Values | |
|---|---|
| xxxx__xxx0 | Entropy coding of PPx = 15, Ppy = 15 (no partition) (*2) |
| xxxx__xxx1 | Entropy coding having partition (*2) |
| xxxx__xx0x | SOP marker unused |
| xxxx__xx1x | SOP marker used (with possibility) |
| xxxx__x0xx | EPH marker unused |
| xxxx__x1xx | EPH marker used (with possibility) |
| Others are reserved | |

TABLE 4

Contents of SGcod

| Parameter | Size (bits) | Values | |
|---|---|---|---|
| Progression order | 8 | Table 10 | Progressive order |
| Number of layers | 16 | 1~65535 | Number of layers |
| Multiple component transformation | 8 | Table 11 | Color transformation |

TABLE 5

Contents of SPcod

| Parameter | Size (bits) | Values | |
|---|---|---|---|
| Number of decomposition levels | 8 | 0~32 | Number of decomposition levels (NL) Zero shows no transformation |
| Code-block width | 8 | Table 13 | Size of code block in horizontal direction Exponent of power of 2 (xcb) |
| Code-block height | 8 | Table 13 | Size of code block in vertical direction Exponent of power of 2 (ycb) |
| Code-block style | 8 | Table 14 | Code block encoding style |
| Transformation | 8 | Table 15 | Wavelet transform |
| Precinct size | variable | Table 16 | Not used when partition (precinct) is not carried out Shows partition size (size in horizontal direction, and size in vertical direction) when partition (precinct) is carried out First eight bits correspond to LL component, and subsequent parameters correspond to decomposition order |

TABLE 6

Progressive order

| Values | Progressive order |
|---|---|
| 0000__0000 | Layer >> resolution >> component >> position |
| 0000__0001 | Resolution >> layer >> component >> position |
| 0000__0010 | Resolution >> position >> component >> layer |
| 0000__0011 | Position >> component >> resolution >> layer |
| 0000__0100 | Component >> position >> resolution >> layer |
| Others are reserved | |

TABLE 7

Color transformation

| Values | |
|---|---|
| 0000__0000 | No definition of color transformation |
| 0000__0001 | ICT (irreversible color transform) when 9-7 filter is used RCT (reversible color transform) when 5-3 filter is used |
| Others are reserved | |

TABLE 8

Size of code block

| Values | |
|---|---|
| xxxx__0000 ~ xxxx__1000 | Exponent of power of 2(xcb,ycb) xcb = 2** (value + 2), ycb = 2** (value + 2) xcb + ycb <= 12 |
| Others are reserved | |

TABLE 9

Style of code block

| Values | |
|---|---|
| xxxx__xxx0 | Without selective arithmetic encoding parallel processing |
| xxxx__xxx1 | With selective arithmetic encoding parallel processing |
| xxxx__xx0x | Without context resetting at encoding path boundary |
| xxxx__xx1x | With context resetting at encoding path boundary |
| xxxx__x0xx | Without terminating in each coding |
| xxxx__x1xx | With terminating in each coding |
| xxxx__0xxx | Context in vertical direction is referenced |
| xxxx__1xxx | Context in vertical direction is not referenced |
| xxx0__xxxx | Predicted terminating is not carried out |
| xxx1__xxxx | Predicted terminating is carried out |
| xx0x__xxxx | Segmentation symbol is not used |
| xx1x__xxxx | Segmentation symbol is used |
| Others are reserved | |

TABLE 10

Wavelet transform

| Values | |
|---|---|
| 0000__0000 | 9-7 irreversible transform |
| 0000__0001 | 5-3 reversible transform |
| Others are reserved | |

Exemplary embodiments of the present invention will be described below with reference to accompanying drawings. The present invention is not limited to these embodiments.

Figure 12:
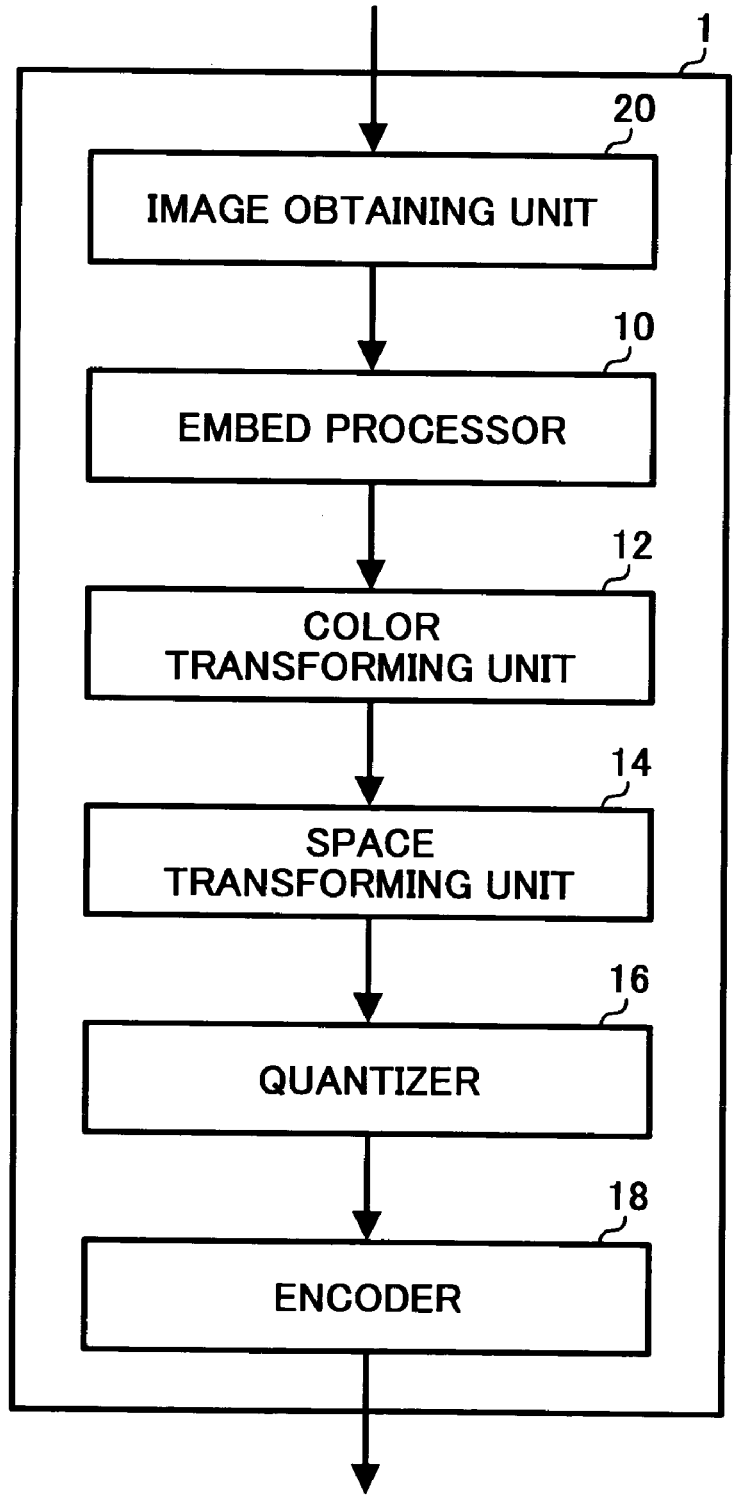
FIG. 12 is a functional block diagram of an image processing apparatus according embodiment of the present invention.

FIG. 12 is a functional block diagram of the image processing apparatus 1 according to a first embodiment of the present invention. The image processing apparatus 1 includes an image obtaining unit 20, an embed processor 10, a color transforming unit 12, a space transforming unit 14, a quantizer 16, and an encoder 18.

The image obtaining unit 20 obtains an image to be processed from an external image input device such as a scanner, a digital camera, a network, a compact disk-read only memory (CD-ROM), a compact disk readable (CD-R), and a digital versatile disk (DVD). The image obtaining unit 20 further obtains image relevant information which is relevant to the image from the external image input device, a file, or information relevant to the file. The image relevant information includes information relevant to a physical size of an image (a wavelet transform coefficient). Specifically, the image relevant information includes an image size, whether an image is divided, and a divided size of the image if the image is divided. The divided size corresponds to a size in tiling or a size in a code block.

The embed processor 10 obtains embed information from the operating unit 22 and the controller 26, and embeds the information into the image obtained by the image obtaining unit 20. The color transforming unit 12 transforms the color of the information-embedded image. The space transforming unit 14 wavelet transforms the color-transformed image. The quantizer 16 quantizes the wavelet-transformed image. The encoder 18 encodes the quantized image.

Figure 13:
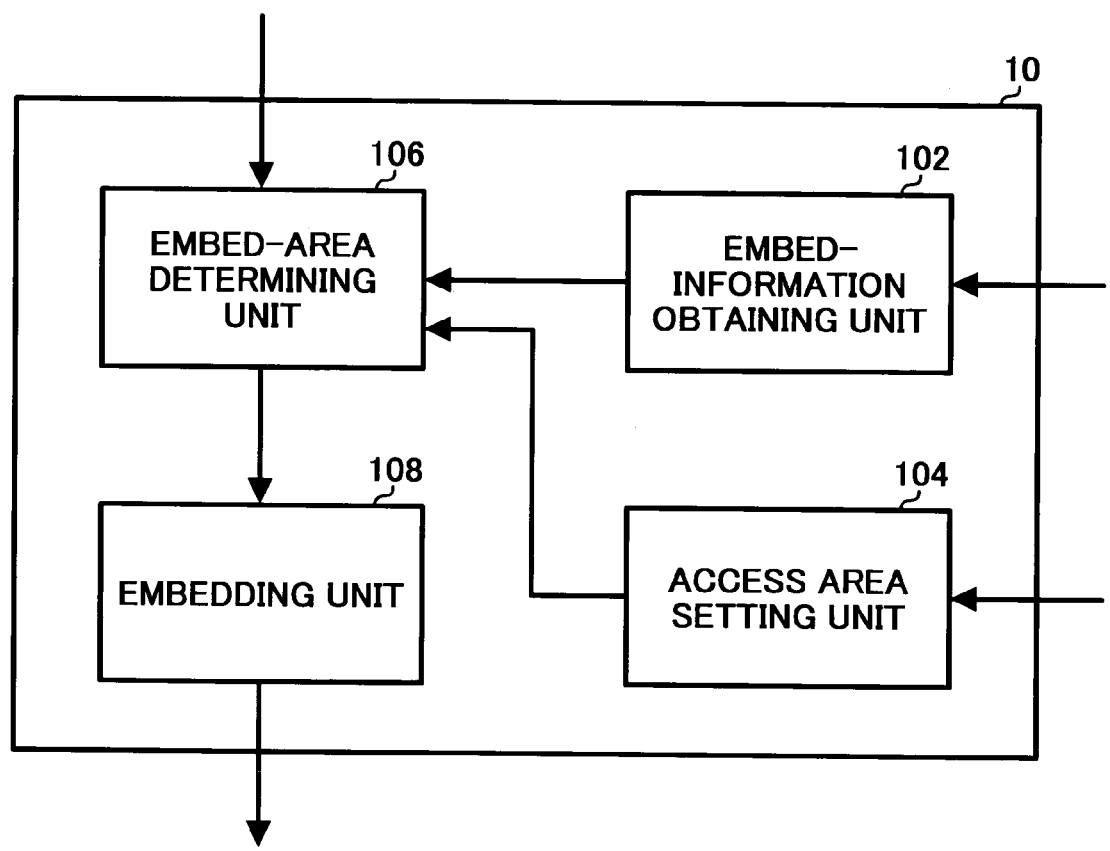
FIG. 13 is a block diagram of a detailed functional configuration of an embed processor shown in FIG. 12.

FIG. 13 is a block diagram of a detailed functional configuration of the embed processor 10 that carries out an embed processing according to the present embodiment. The embed processor 10 includes an embed-information obtaining unit 102, an access-area setting unit 104, an embed-area determining unit 106, and an embedding unit 108.

The embed-information obtaining unit 102 obtains embed information to be embedded into the image obtained by the image obtaining unit 20, from the operating unit 22 and the controller 26. The embed-information obtaining unit 102 obtains embed relevant information that is relevant to the embed information. The embed relevant information is referred to by the embed processor 10 at the time of embedding the information. Specifically, the embed relevant information includes a size of embed information, a position in an image to which the information is to be embedded, possibility of a divided embedding, importance, and synchronization of an image area and an adjacent tile (code block) boundary. The embed operation is explained in detail later with reference to FIG. 15.

The access-area setting unit 104 receives an access area assignment from an application. Specifically, the access-area setting unit 104 receives an assignment of a vertical size and a horizontal size of an access area, and sets the access area based on the access area assignment.

The embed-area determining unit 106 obtains an image and image relevant information from the image obtaining unit 20, and obtains embed relevant information from the embed-information obtaining unit 102. The embed-area determining unit 106 also obtains an access area set by the access-area setting unit 104, and determines the embed information area based on these pieces of information.

The embedding unit 108 embeds the information obtained by the embed-information obtaining unit 102 into the embed area determined by the embed-area determining unit 106.

Figure 14:
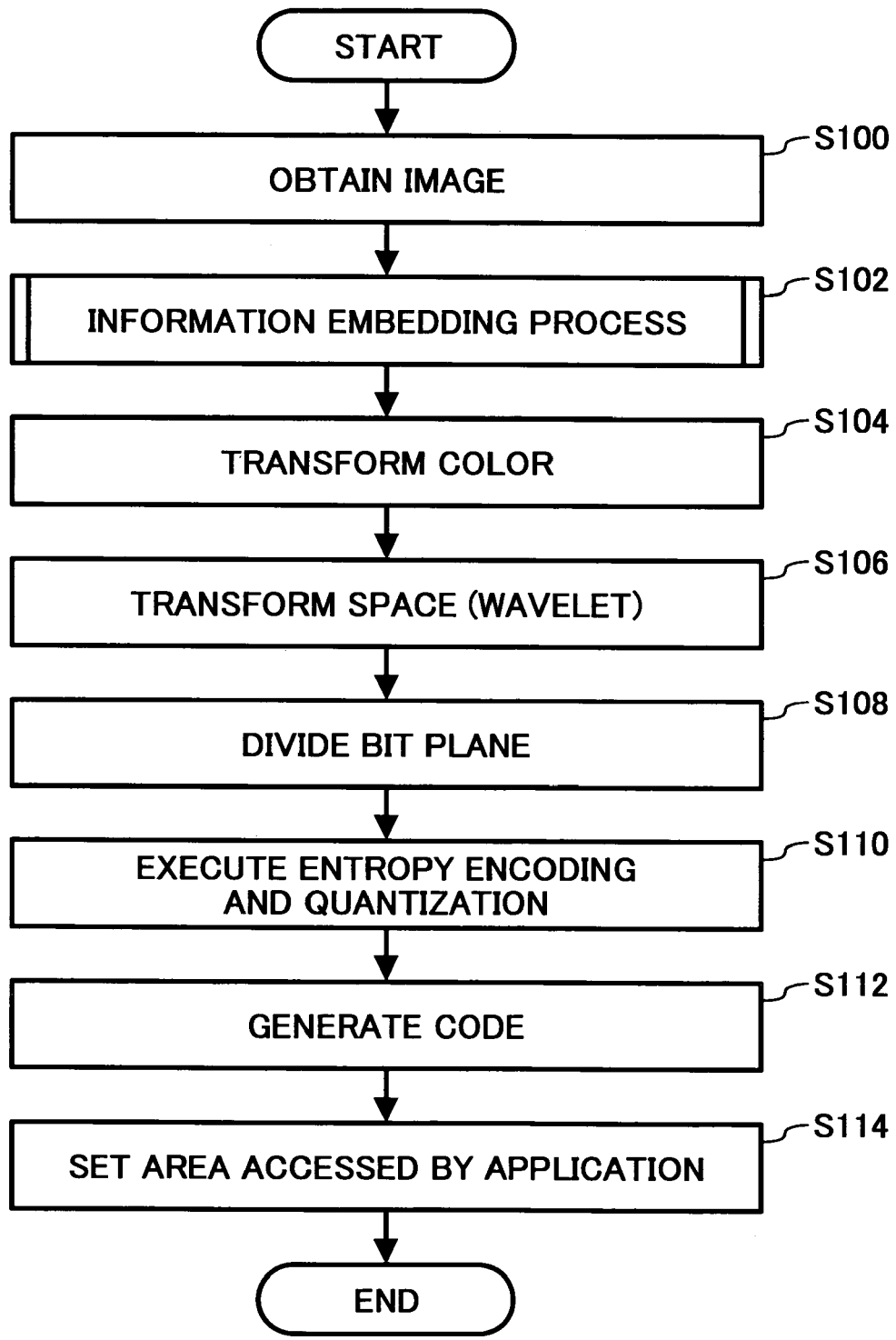
FIG. 14 is a flowchart of an image processing procedure carried out by the image processing apparatus shown in FIG. 12.

FIG. 14 is a flowchart of an image processing procedure carried out by the image processing apparatus 1. First, the image obtaining unit 20 of the image processing apparatus 1 obtains an image from the reader 21 (step S100). The embed processor 10 performs information embedding process to embed information into the image (step S102). Then, the color transforming unit 12 transforms the color of the information-embedded image (step S1104). Next, the space transforming unit 14 wavelet transforms the color-transformed image (step S106). The quantizer 16 divides the bit plane (step S108). The quantizer 16 and the encoder 18 performs entropy quantized encoding and encoded quantization (step S110), thereby generating a code (step S112). The quantizer 16 and the encoder 18 set an access area based on an application (step S114). The image processing apparatus 1 completes the image processing.

Figure 15:
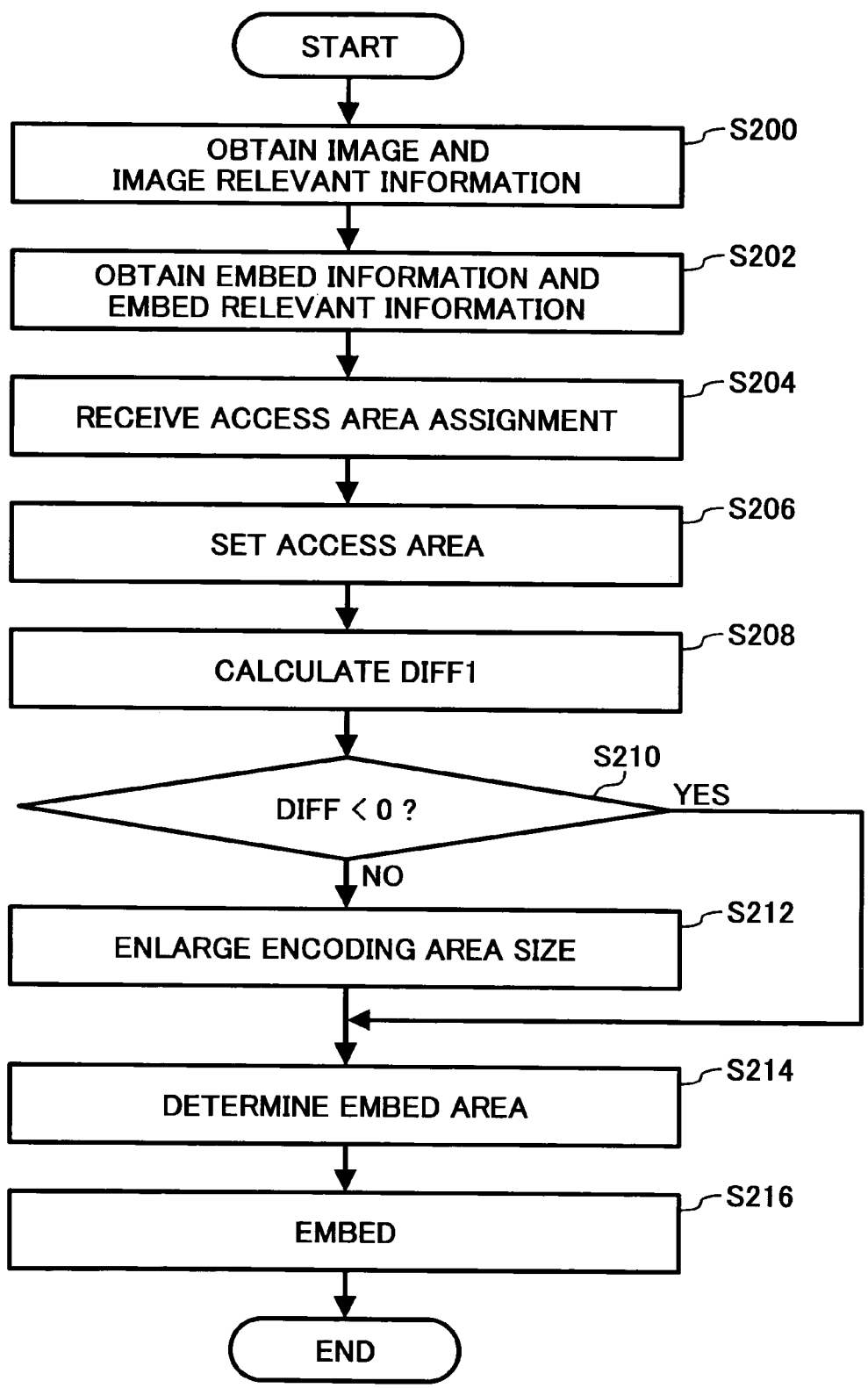
FIG. 15 is a flowchart of a detailed processing procedure carried out by the embed processor in an information embedding process (step S102) explained with reference to FIG. 14.

FIG. 15 is a flowchart of the information embedding process of step S102 shown in FIG. 14. The embed-area determining unit 106 obtains an image and image relevant information from the image obtaining unit 20 (step S200). The embed-information obtaining unit 102 obtains embed information and embed relevant information from the operating unit 22 or the reader 21 (step S202). The access-area setting unit 104 receives an assignment of an access area from an application (step S204), and sets the access area (step S206).

Figure 16:
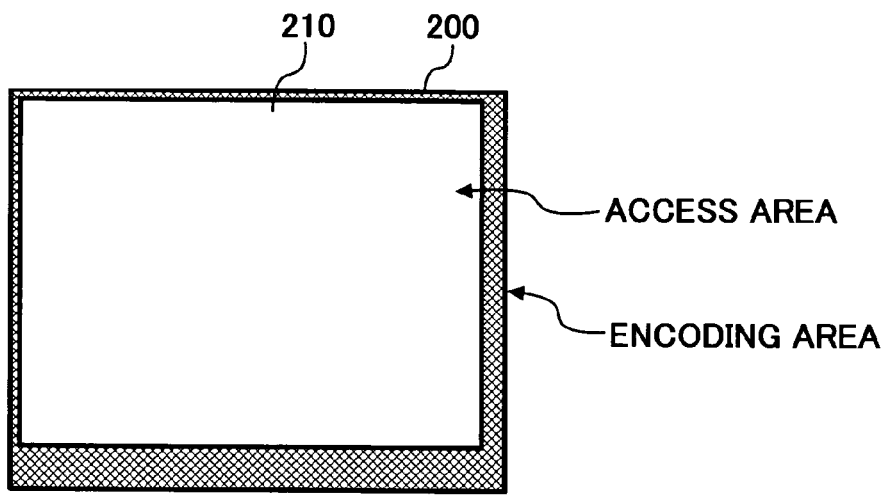
FIG. 16 is an explanatory diagram of an access area.

FIG. 16 is an explanatory diagram of an access area. An access area 210 is located in an encoding area 200, and is accessed by an application. Specifically, the application performs display, printing, or the like in the access area. The encoding area 200 is encoded by the encoder 18.

In FIG. 15, the embed-area determining unit 106 calculates a size difference DIFF1 based on an image size obtained from the image obtaining unit 20, that is, based on a size of the encoding area 200 and a size of the access area 210 (step S208). The DIFF1 is obtained from the following expression.

$$DIFF1 = ((\text{size of image}) - (\text{size of access area})) - (\text{size of embedded information}) \quad (5)$$

When the DIFF1 is smaller than "0" (No at step S210), both or either one of a vertical size and a horizontal size of the image is enlarged, and header information is updated to a new value (step S212). The image size is enlarged according to need until the image is large enough to accommodate embed information. In other words, the encoding area 200 is enlarged.

The DIFF1 has a minimum size necessary to enlarge the encoding area 200. Therefore, the image can be enlarged based on a size larger than the DIFF1.

Figure 17:
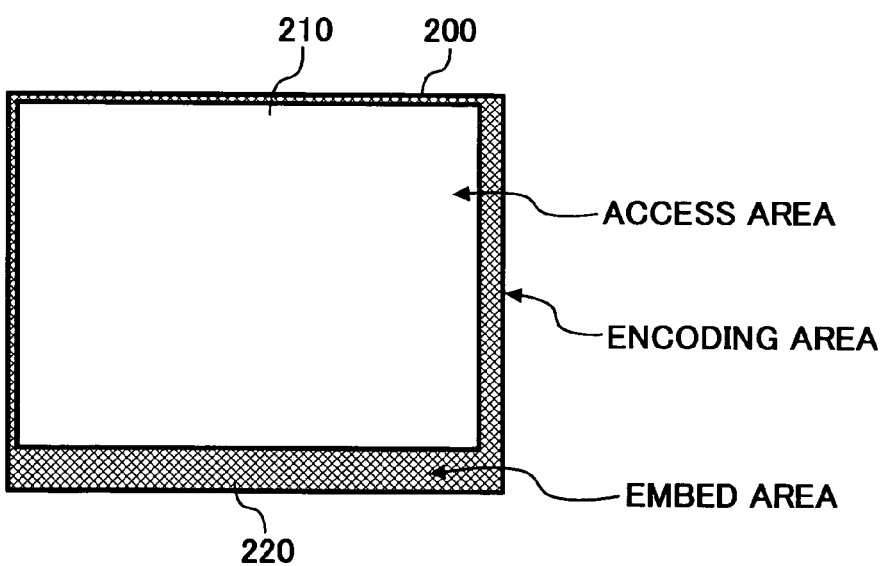
FIG. 17 is an explanatory diagram of a processing of enlarging an image size.
Figure 18:
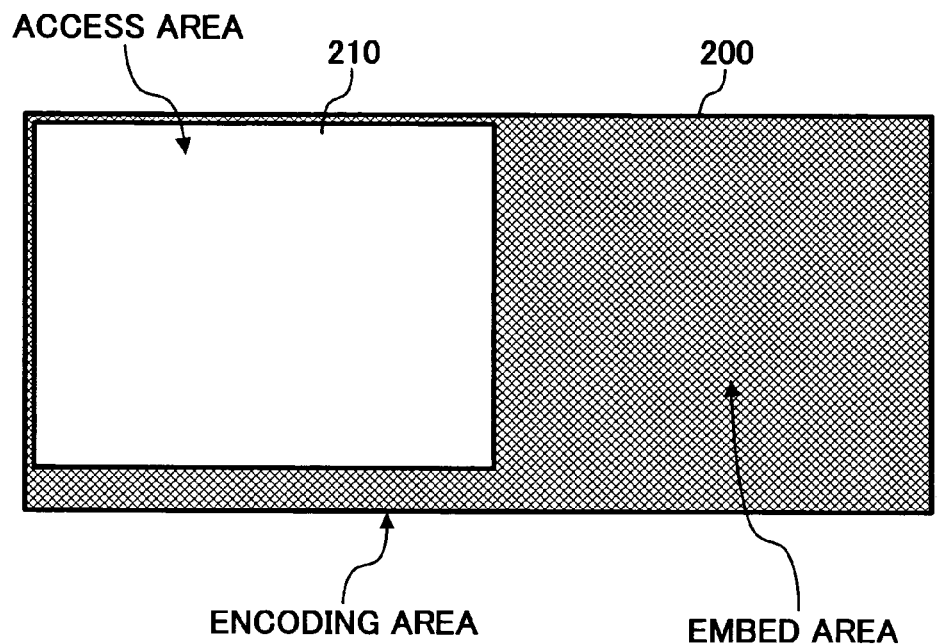
FIG. 18 is an explanatory diagram of the processing of enlarging an image size.

FIG. 17 and FIG. 18 are explanatory diagrams of the processing of enlarging an image size. An embed area 220 shown in FIG. 17 is an area into which information is embedded. The embed area 220 is a difference between the encoding area 200 and the access area 210. As explained above, information is embedded into the area encoded by the encoder 18 and the area not accessed by the application.

However, when the size of the embed area 220 is smaller than the size of the embed information, all the embed information cannot be embedded into the embed area 220. In this case, the encoding area 200 is enlarged.

FIG. 18 depicts the embed area 220 after enlargement. When the size of the encoding area 200 is increased, the embed area 220 can have a size in which all the embed information can be embedded.

In this case, a position at which the information is embedded is determined based on an embed position included in the embed relevant information. In FIG. 17 and FIG. 18, the embed area 220 is provided on the right side and the lower side of the access area 210. However, the embed area 220 can be on the upper side of the access area 210, or on the left side of the access area 210. The embed area 220 is preferably provided in the area surrounding the access area 210 or the image area.

Figure 19:
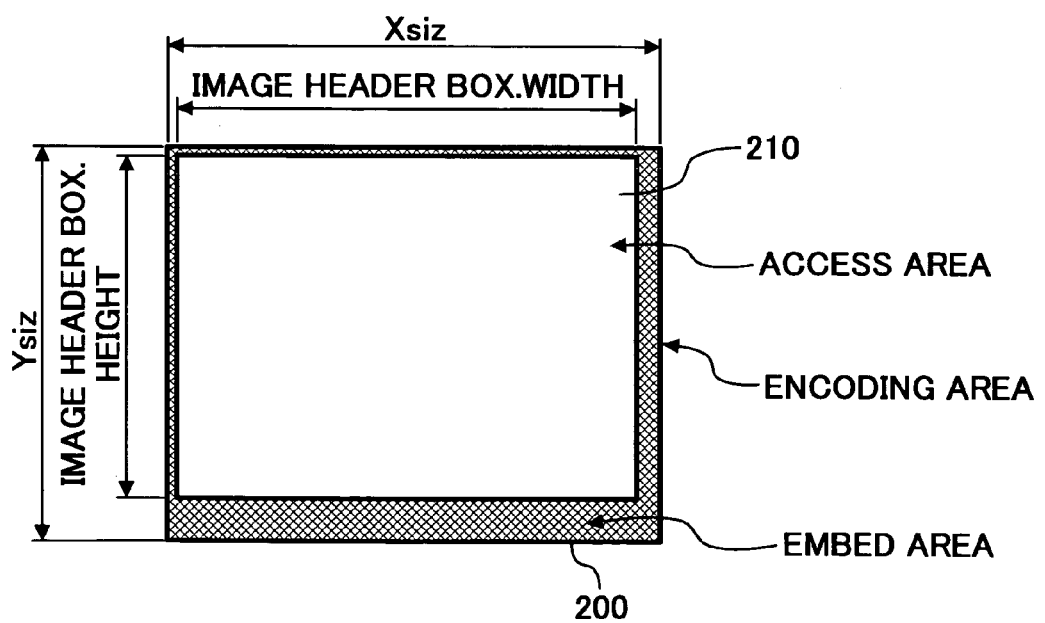
FIG. 19 is an explanatory diagram of Xsiz and Ysiz.

The image size is contained in the image relevant information as Xsiz and Ysiz. FIG. 19 is an explanatory diagram of Xsiz and Ysiz. Xsiz is a horizontal length of the encoding area 200, that is, a horizontal size of the image. Ysiz is a vertical length of the encoding area 200, that is, a vertical size of the image. When the image is to be enlarged, the embedding unit 108 updates the values of Xsiz and Ysiz to values after the image enlargement.

As described earlier, a JP2 file format for recording a value representing a parameter specific to a JP2 file is prescribed in the IS15444-1 (JPEG2000 Part1) Annex I. An image display area is one example of specific information included in the IS15444-1(JPEG2000 Part1) Annex I.

In I.5.3.1 of the IS15444-1 (JPEG2000 Part1) Annex I, HEIGHT and WIDTH of elements defined as Image Header Box prescribe that a vertical size and a horizontal size of a display area are shown in pixel unit.

A horizontal length of the access area 210 is recorded as a value of a WIDTH field of the Image Header Box in the embed relevant information. Similarly, a vertical length of the access area 210 is recorded as a value of a HEIGHT field of the Image Header Box in the embed relevant information.

A horizontal length of the access area 210 is contained as Image Header Box. Width in the embed relevant information. A vertical length of the access area 210 is contained as Image Header Box. Height in the embed relevant information.

On the other hand, when the DIFF1 is smaller than "0" (Yes at step S210), an embed area is determined (step S214). The embedding unit 108 embeds the information into the determined embed area 220 (step S216).

The embed processing is realized by embedding the information in binary or in a text format according to a constant format set common to the application that embeds the information and the application that subsequently accesses the embedded information.

The format of embedding information is not limited to the above. As long as the application that embeds the information and the application that subsequently accesses the embedded information can commonly interpret the format, the information can be embedded in another format.

The embed area determined at step S214 can be recorded in a file as embed area access information. Instead of recording the embed area, the embed area can be determined in advance so that the application that embeds the information and the application that subsequently accesses the embedded information can commonly interpret the embed area.

The embed processor 10 sets a value of the access area assigned by the application into an assigned area of a file format, capsules a generated code, thereby setting the access area assigned by the application. The embed processor 10 completes the information embedding process.

Figures 20, 21:
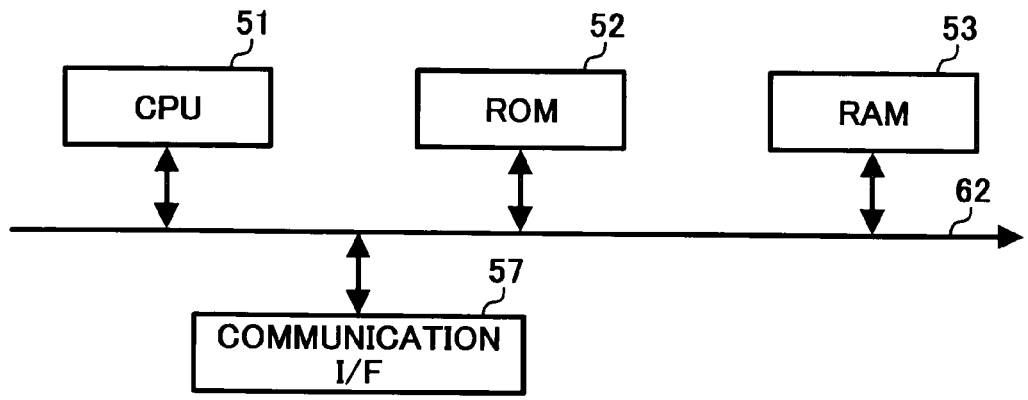
FIG. 20 is a hardware configuration diagram of the image processing apparatus shown in FIG. 12.
FIG. 21 is a table of binary codes, gray codes, and corresponding hexadecimal notation from 0 to F.

FIG. 20 is a hardware configuration diagram of the image processing apparatus 1 according to the first embodiment. The image processing apparatus 1 includes: a ROM 52 that stores an image processing program and the like used by the image processing apparatus 1 to execute an image processing; a central processing unit (CPU) 51 that controls each unit of the image processing apparatus 1 following the program stored in the ROM 52; a random access memory (RAM) 53 that stores various kinds of data that are necessary to control the image processing apparatus 1; a communication interface (I/F) 57 that is connected to a network to perform communications; and a bus 62 for connecting these units.

The image processing program of the image processing apparatus 1 can be recorded into a computer-readable recording medium such as a CD-ROM, a floppy (registered trade name) disk (FD), a DVD, and the like, in an installable or an executable format.

In this case, the image processing apparatus 1 reads the image processing program from the recording medium, and executes and loads the program onto a main storage, thereby generating various parts explained in the software configuration onto the main storage.

The image processing program according to the present embodiment can be stored into a computer that is connected to a network such as the Internet, and can be downloaded through the network.

The above embodiment can be variously modified and improved.

In the above embodiment, although the embed-area determining unit 106 sets an embed area into an area adjacent to the access area, it is not limited thereto. According to a first modification of the embodiment, the embed-area determining unit 106 can set the embed area into an area not adjacent to the access area, as long as the embed area is set into an area other than the access area.

In the above embodiment, the embedding unit 108 directly embeds the information into the embed area 220. According to a second modification of the embodiment, the embed information can be encoded, and the embedding unit 108 can embed the encoded embed information into the embed area 220.

When it is assumed that the distribution of binary values (for 8-bit information, values from 0 to 255) of embed information such as an uncompressed image and an audio file follow the Gaussian distribution, the embed information can be embedded in a gray code. With this embodiment, the compression rate can be improved as explained below. Bit plane quantization can be also effectively achieved.

FIG. 21 is a table of binary codes, gray codes, and corresponding hexadecimal notation from 0 to F. With a boundary line drawn between 7 and 8, when symmetry between bytes of each digit in the direction from 7 to 0 and bytes of each digit in the direction from 8 to F is considered, in the binary code, the layout of "0" and the layout of "1" in the fourth digit from the bottom are symmetrical. However, the layout of "0" and the layout of "1" in each of the first to the third digits are unsymmetrical. On the other hand, in the gray code, the layout of "0" and the layout of "1" are symmetrical in all digits.

When the embed information has a substantially symmetrical frequency distribution of generated bytes in the left and right directions and has a high generation frequency in a center value like an image, a bit plane of the most significant bit (MSB) 2 has a high generation frequency of "1" in the bit plane quantization. Therefore, when a gray code is used, entropy can be further decreased, and a high data compression can be achieved.

Figure 22:
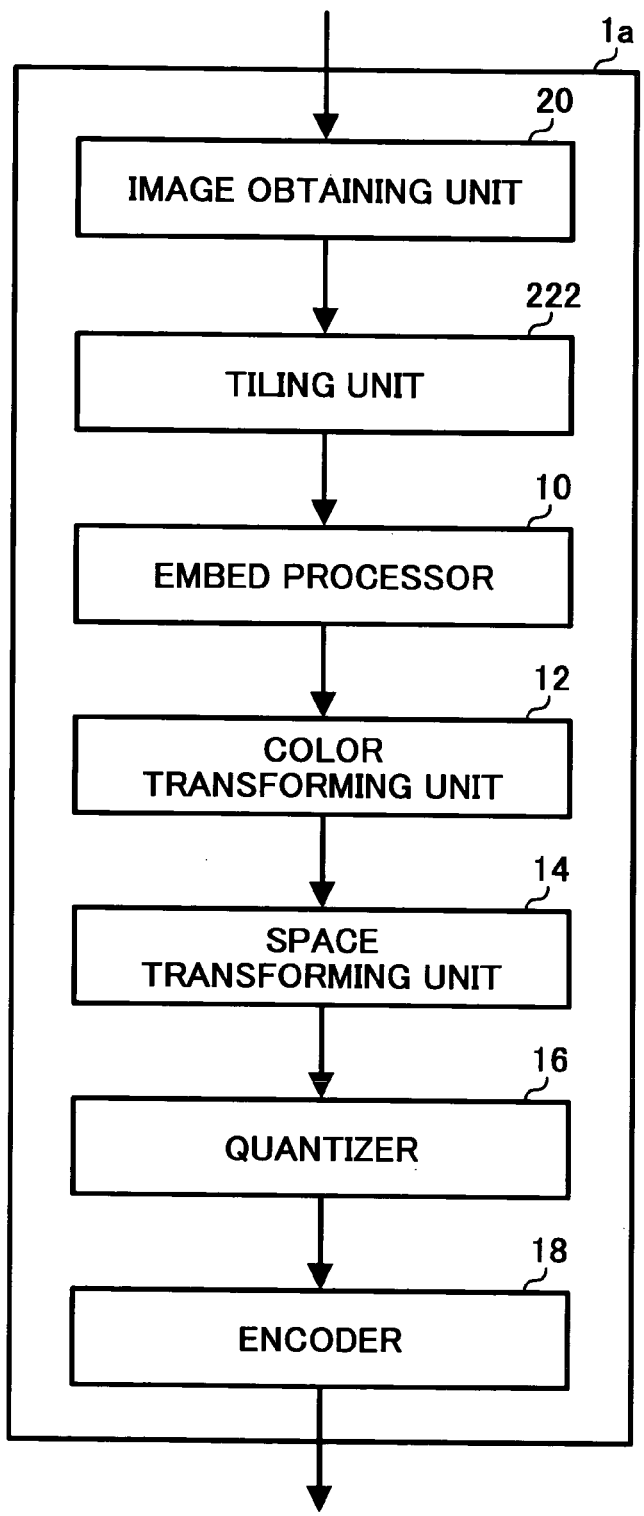
FIG. 22 is a functional block diagram of an image processing apparatus according to a second embodiment of the invention.

FIG. 22 is a functional block diagram of an image processing apparatus 1a according to a second embodiment of the invention. The image processing apparatus 1a includes a tiling unit 222.

Figure 23:
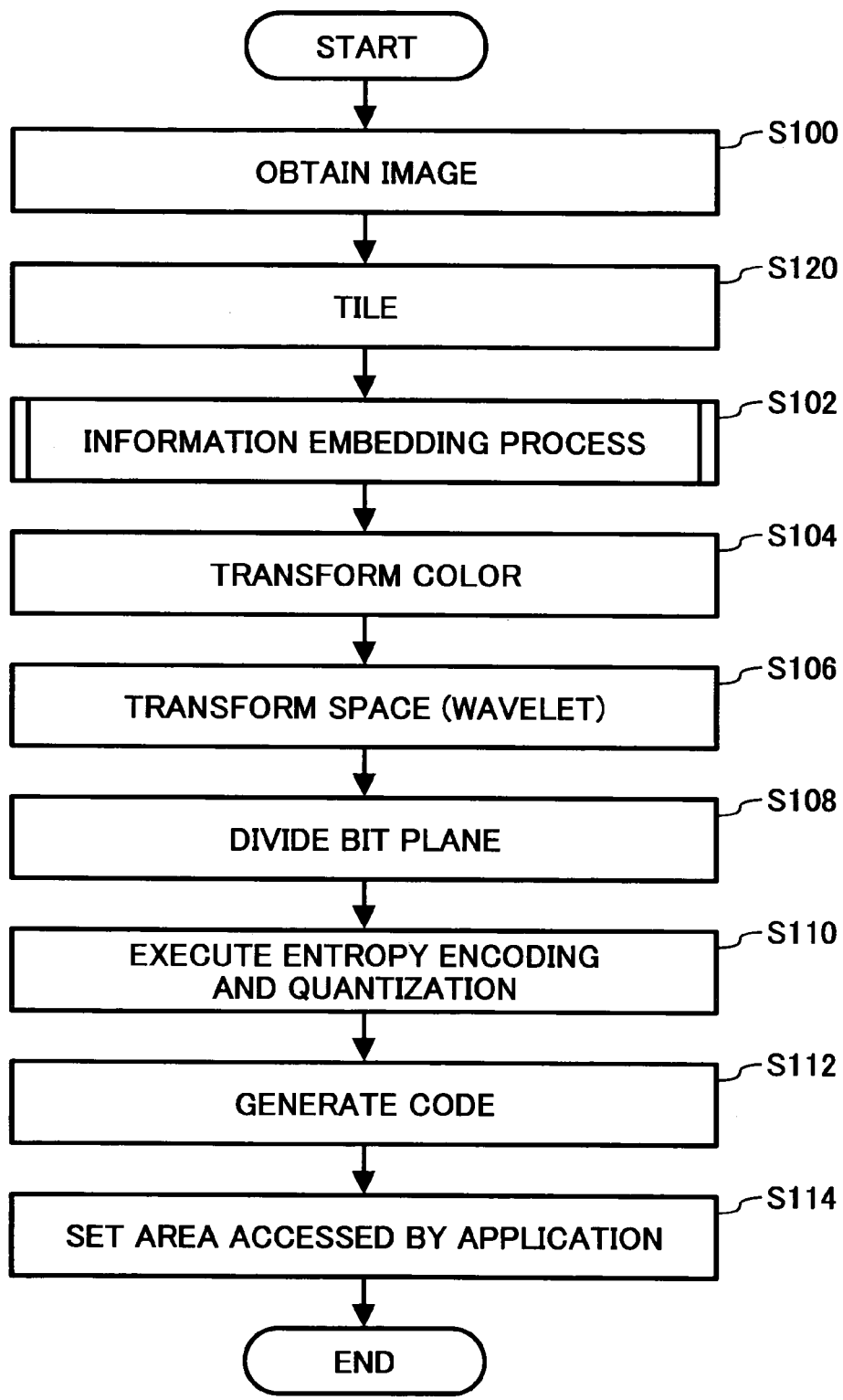
FIG. 23 is a flowchart of an image processing procedure carried out by the image processing apparatus shown in FIG. 22.

FIG. 23 is a flowchart of an image processing procedure carried out by the image processing apparatus 1a according to the second embodiment. The tiling unit 222 tiles the image obtained by the image obtaining unit 20 at step S100 (step S120). The embed-area determining unit 106 performs an information embedding process to embed an embed area in the tiled image (step S102).

Figure 24:
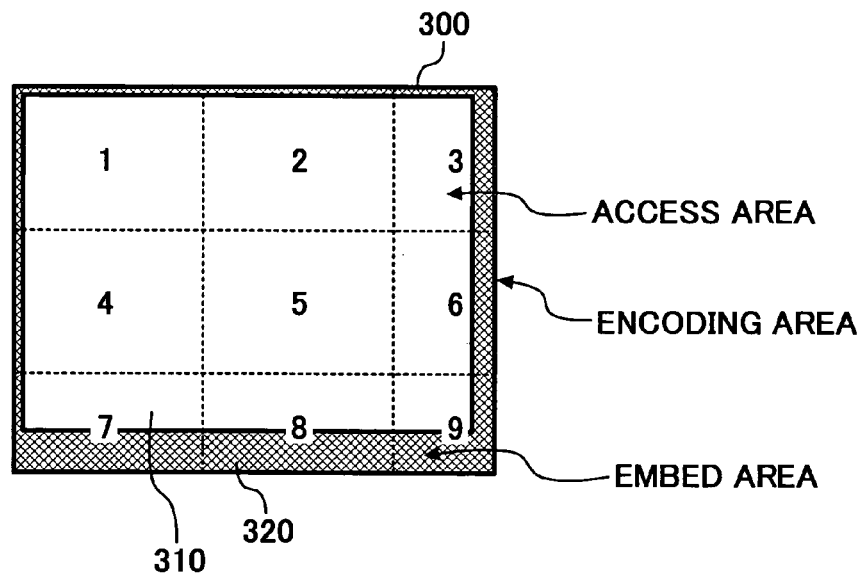
FIG. 24 depicts an embed area of a tiled image.

FIG. 24 depicts an embed area 320 of a tiled image corresponding to another embodiment of the present invention. The embed area 320 corresponds to a difference between an encoding area 300 and an access area 310.

In FIG. 24, an image is divided into nine tiles. In this case, the embed information can be embedded into only tiles 3, 6, 7, 8, and 9. In other words, the embed information cannot be embedded into tiles 1, 2, 4, and 5.

Accordingly, the embed information can be embedded into an area other than the application area in the tiled image in a similar manner to that explained in the first embodiment.

Other configurations and processing of the image processing apparatus 1a according to the second embodiment are similar to those of the image processing apparatus 1 according to the first embodiment.

The configurations and processing of the image processing apparatus 1a according to the second embodiment can be modified and improved in various ways.

Figure 25:
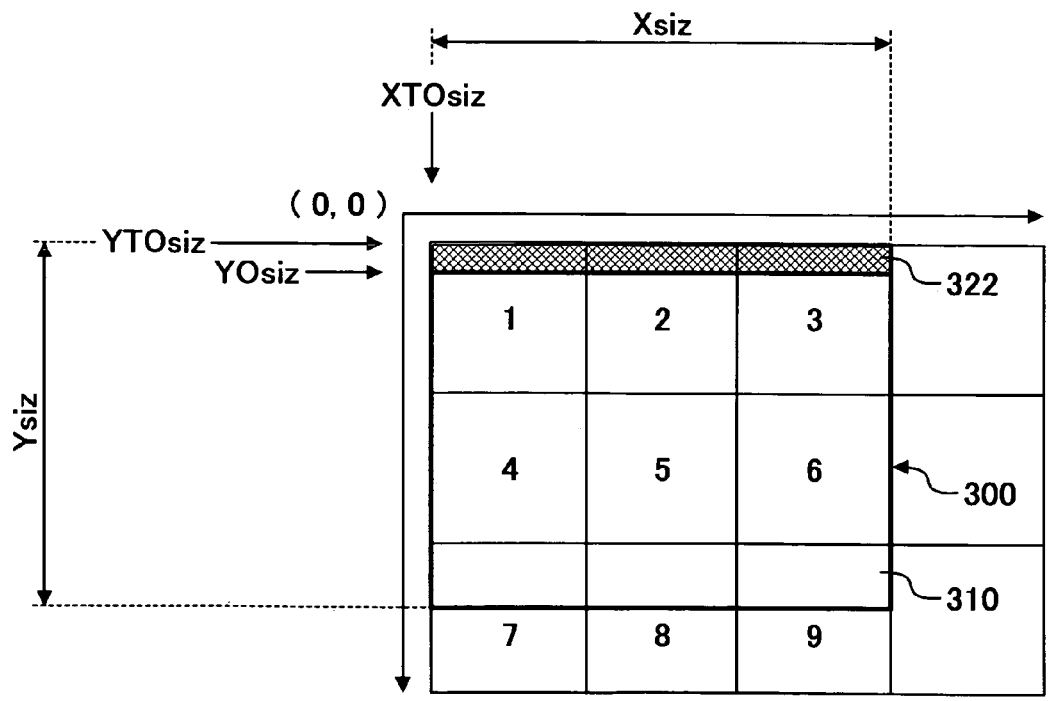
FIG. 25 depicts an embed area provided on an upper side.

Although the embed area 320 is provided on the right side and the lower side of the access area 310 in the second embodiment, the embed area can be also provided on the upper side as a first modification of the second embodiment. FIG. 25 depicts an embed area 322 provided on the upper side of the access area.

In FIG. 25, the origin of the tiling is set as (XTOsiz, YTOsiz). The upper left vertex of the access area 310 is set as (XOsiz, YOsiz). In this example, the upper left vertex (XOsiz, YOsiz) of the access area 310 is disposed below the origin (XTOsiz, YTOsiz) of the tiling. With this embodiment, the embed area 320 can be provided in the upper area. In other words, the embed area 322 is a square area having the origin (XTOsiz, YTOsiz) of the tiling and the upper right vertex (XTOsiz+Xsiz, YOsiz) of the access area 310 as vertexes.

The embed area can be set on the upper side of the access area 310. In this case, the embed-area determining unit 106 changes the origin of tiling, that is, the offset size (XTOsiz, YTOsiz) of the image, so that all the embed information can be embedded into the embed area 322.

Figure 26:
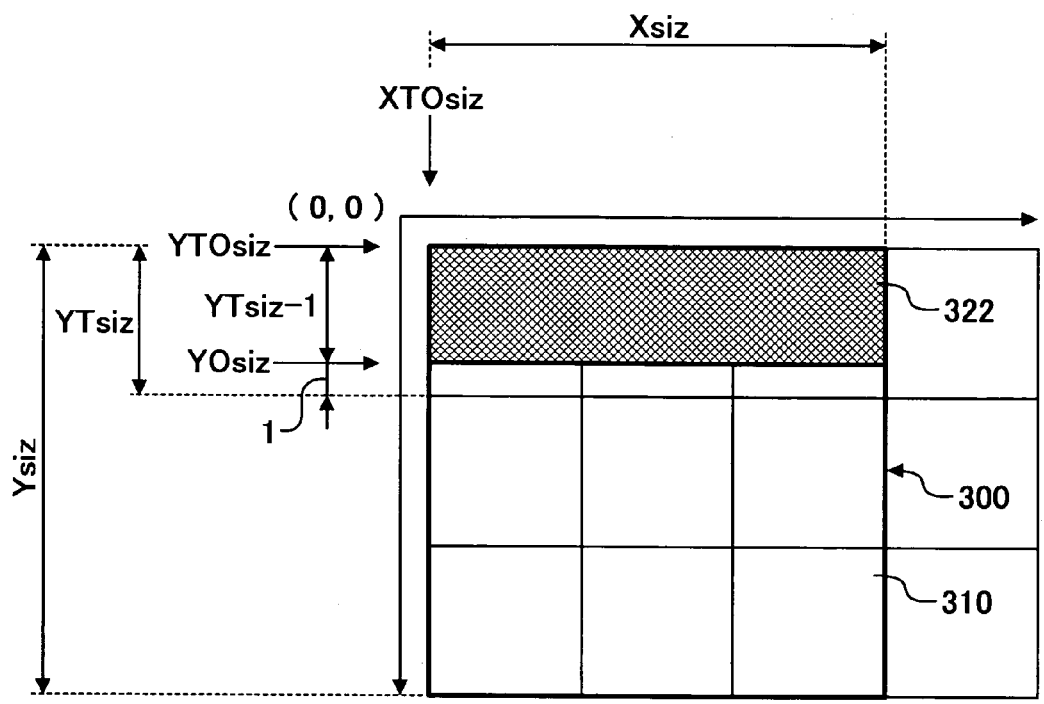
FIG. 26 depicts a width in a vertical direction of the embed area provided on the upper side.

In tiling, at least one pixel of the access area 310 must be contained in the upper left tile. Therefore, the size of the embed information that can be embedded into the upper side is limited. In other words, as shown in FIG. 26, when the length of one side of a tile is YTsiz, the width of the embed area 322 in the vertical direction becomes (YTsiz−1). In other words, (Xsiz×(YTsiz−1)) is a maximum size of the information that can be embedded.

While the embed area 320 is provided on the right side and the lower side of the access area 310 in the present embodiment, the embed area can be provided on the left side of the access area 310.

Figure 27:
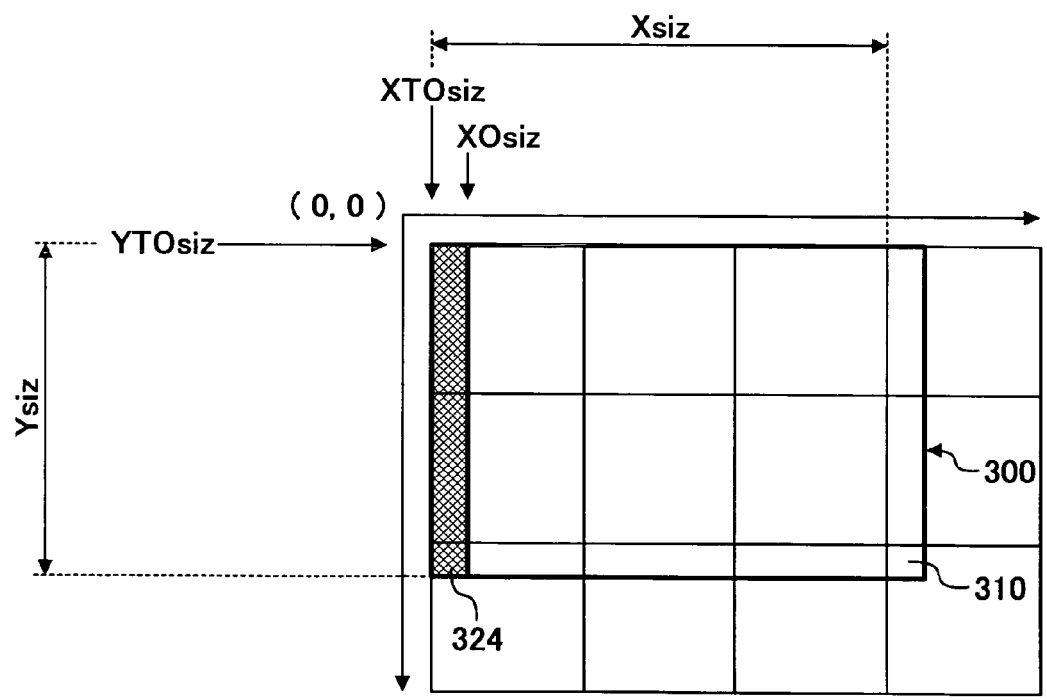
FIG. 27 depicts an embed area provided on a left side.

FIG. 27 depicts an embed area 324 provided on the left side of the access area 310. The upper left vertex (XOsiz, YOsiz) of the access area 310 is disposed on the right side of the origin (XTOsiz, YTOsiz) of the tiling, like the access area 310 shown in FIG. 25. With this embodiment, the embed area 324 can be provided in the left side area. In other words, the embed area 324 is a square area having the origin (XTOsiz, YTOsiz) of the tiling and the lower left vertex (XOsiz, YTOsiz+Ysiz) of the access area 310 as vertexes. As explained above, the embed area can be also set on the left side of the access area 310.

Figure 28:
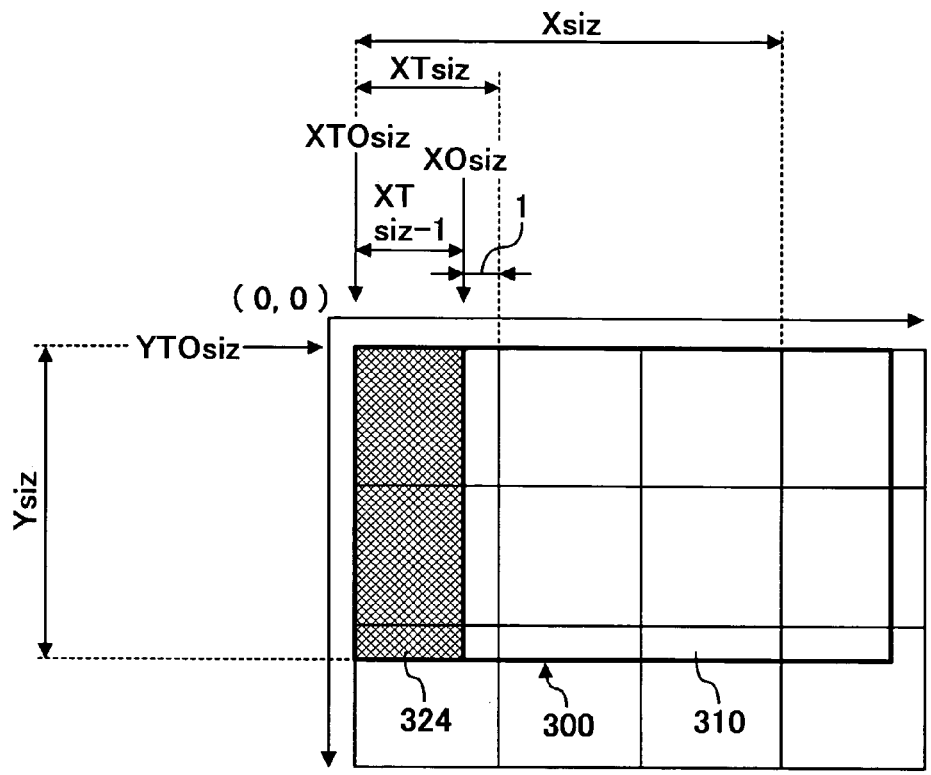
FIG. 28 depicts a width in a horizontal direction of the embed area provided on the left side.

The upper left tile needs to include at least one pixel of the access area 310. Therefore, the size of the embed information that can be embedded on the left side is also limited. In other words, as shown in FIG. 28, the width of the embed area 324 in the horizontal direction becomes (XTsiz−1) when the length of one side of a tile is XTsiz. In other words, ((XTsiz−1)×Ysiz) is a maximum size of the embed information that can be embedded.

Figure 29:
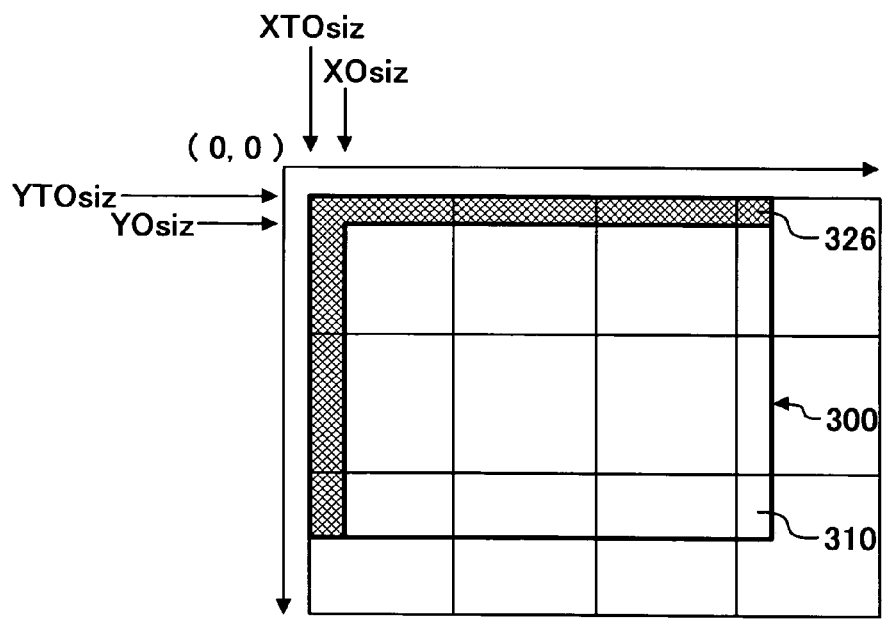
FIG. 29 depicts an embed area.
Figure 30:
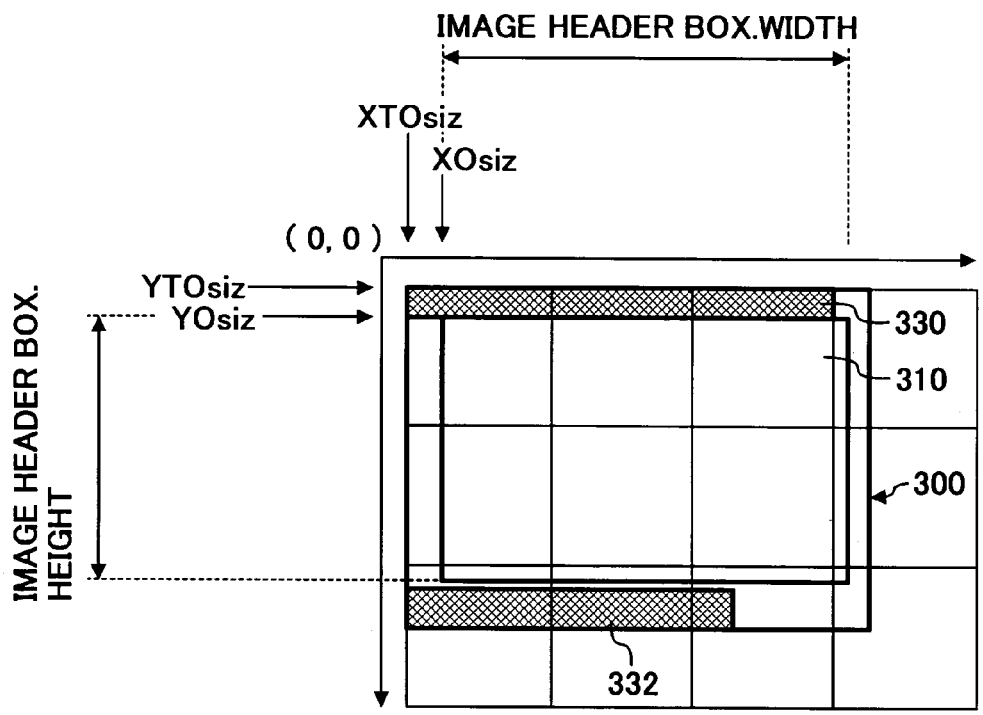
FIG. 30 depicts an embed area.

Alternatively, as shown in FIG. 29, the upper side and the left side of the access area 310 can be an embed area 326, which corresponds to embodiments of the present invention. In this case, the sizes of embed information that can be embedded into the upper area and the left area are also limited as described above. The area into which information can be embedded is not limited to one, and the information can be embedded into divided areas. Information is embedded into the non-image area of plural tiles. For example, information is embedded into the left side and the upper side of the access area in FIG. 29, and information is embedded into the upper side and the lower side of the access area in FIG. 30. The area to be accessed and the access order are also recorded in the embed relevant information used at step S202.

As a second modification of the embodiment, information can be embedded into two physically separate embed areas. The encoding area 300 shown in FIG. 30 has two embed areas 330 and 332. When embed areas are provided at plural independent positions, more information can be embedded. In this case, two pieces of different information can be embedded into the two embed areas.

One piece of embed information can be divided into two pieces of information, and these divided pieces of information can be embedded into two embed areas. The embed relevant information includes division information which indicates whether information can be embedded dividedly. When the embed relevant information includes information indicating that embed information can be divided, one piece of information is embedded into plural independent embed areas.

A size of one piece of embed information is compared with a size of an embed area. When the size of the embed information is larger than the size of the embed area, this embed information can be divided and embedded into plural embed areas.

The order of embedding information and partitions of embed information are not particularly limited, and can be determined separately so that the embed information can be encoded and decoded consistently.

Figure 31:
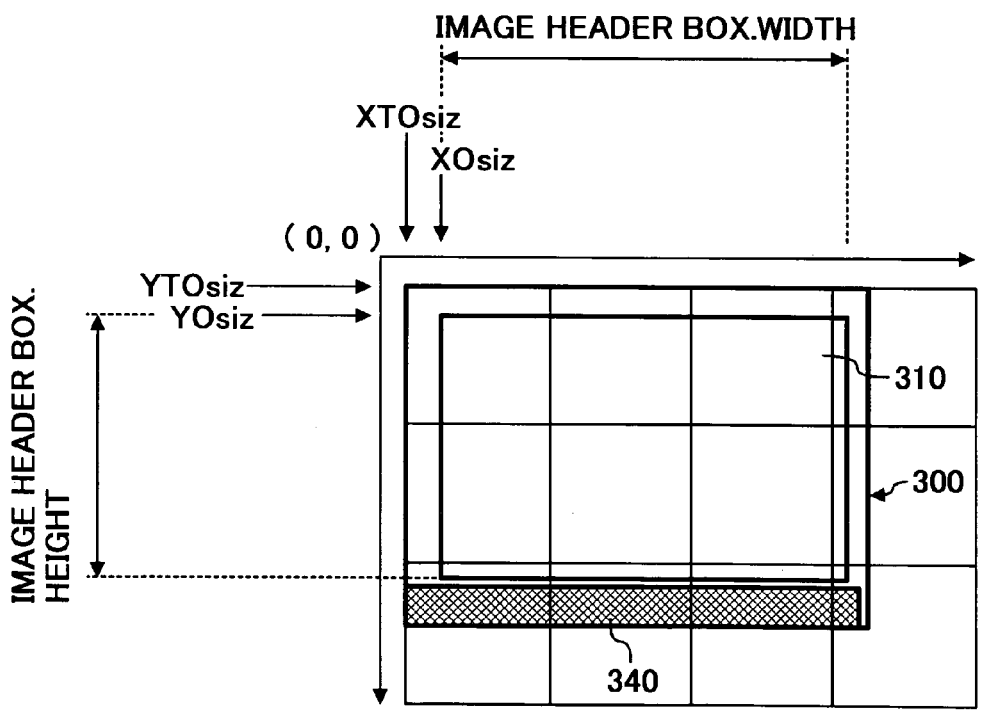
FIG. 31 depicts an embed area.

On the other hand, when information cannot be embedded dividedly, an embed area 340 can be provided on the lower side of the access area 310 as shown in FIG. 31. The size of the embed area on the lower side of the access area 310 is not limited. Therefore, a continuous embed area can be enlarged limitlessly. As another alternative, an embed area can be provided on the right side of the access area 310. The size of the embed area on the right side of the access area 310 is also not limited. Therefore, a continuous embed area can be enlarged limitlessly.

Plural pieces of information can be embedded into one image. In this case, plural pieces of information can be embedded into one embed area. Alternatively, plural pieces of information can be embedded into physically separated embed areas.

Figure 32:
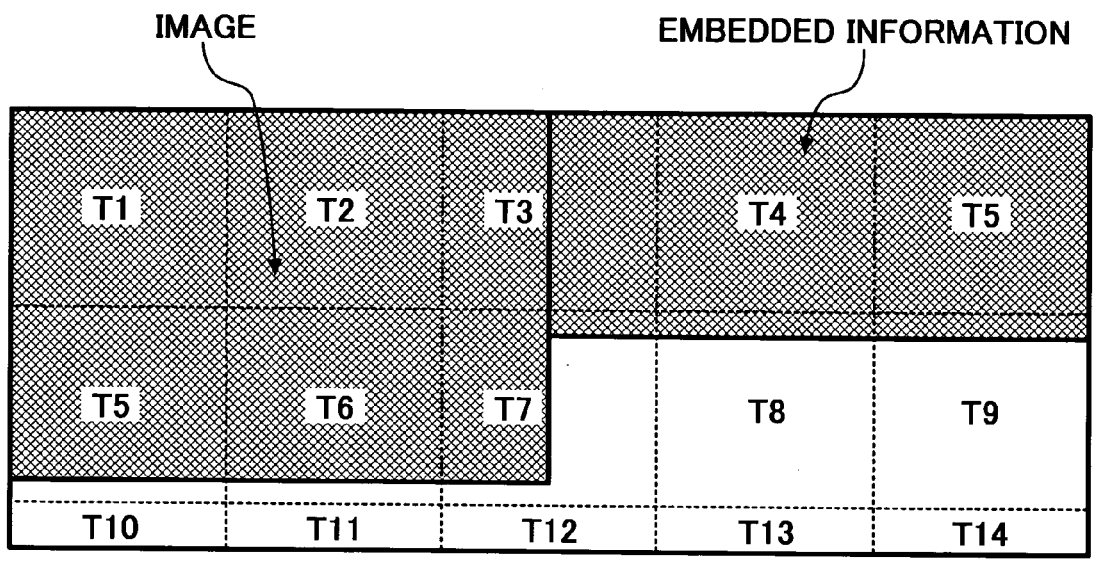
FIG. 32 depicts information embedded into an area adjacent to an access area.

As a third modification of the embodiment, as shown in FIG. 32, embed information can be set adjacently to the access area at the tiling time based on property information synchronous with the image area obtained as embed relevant information and an adjacent tile (code block) boundary. By setting the embed information adjacently to the access area, the encoding amount can be decreased.

Figure 33:
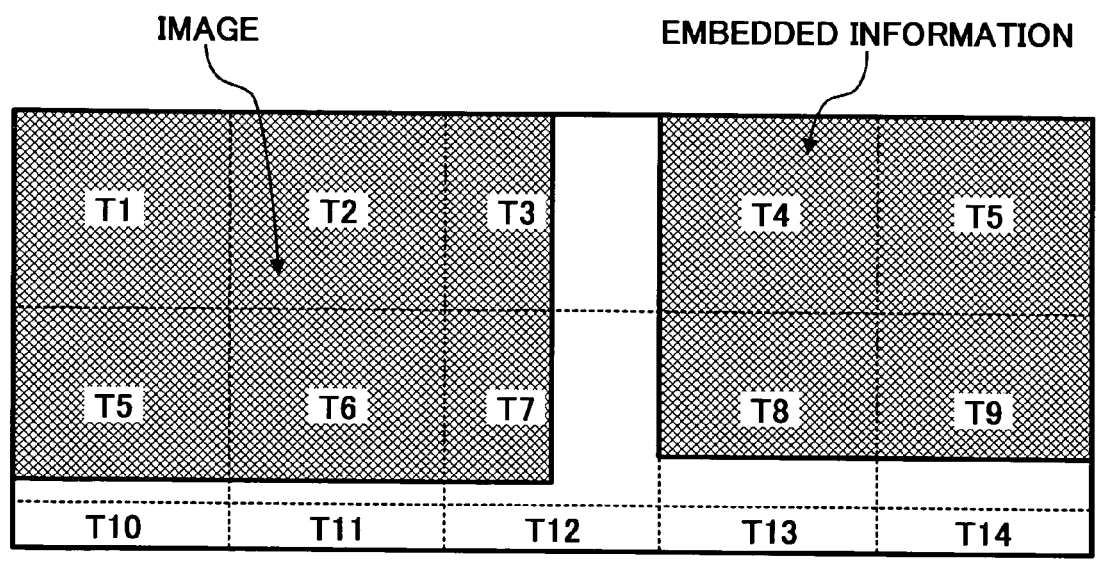
FIG. 33 depicts information embedded by matching a starting point of the embedded information with a tile boundary.

As a fourth modification of the embodiment, as shown in FIG. 33, information can be embedded so that a starting point of the embed information coincides with the tile boundary. By setting the embed information so that the information coincides with the tile boundary, the embed information can be accessed easily.

As a fifth modification of the embodiment, not only embedding the starting point as offset zero to the boundary corresponding to the access area of an application or a tile boundary in the third modification of the present embodiment, a constant value (for example, zero) can be set as a delimiter to separate the two areas.

Figure 34:
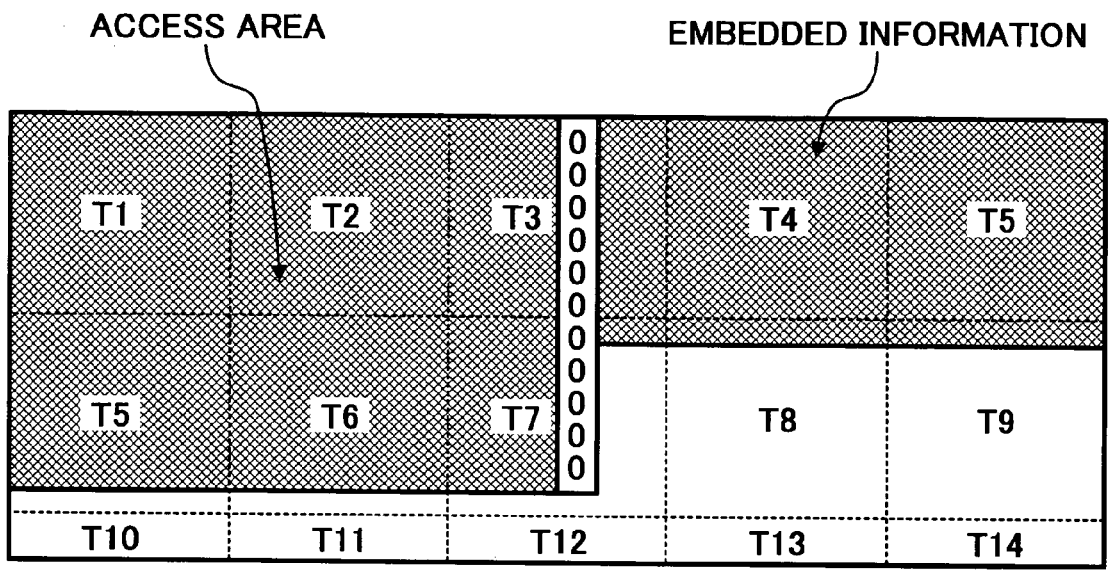
FIG. 34 is an example of a setting of a delimiter.
Figure 35:
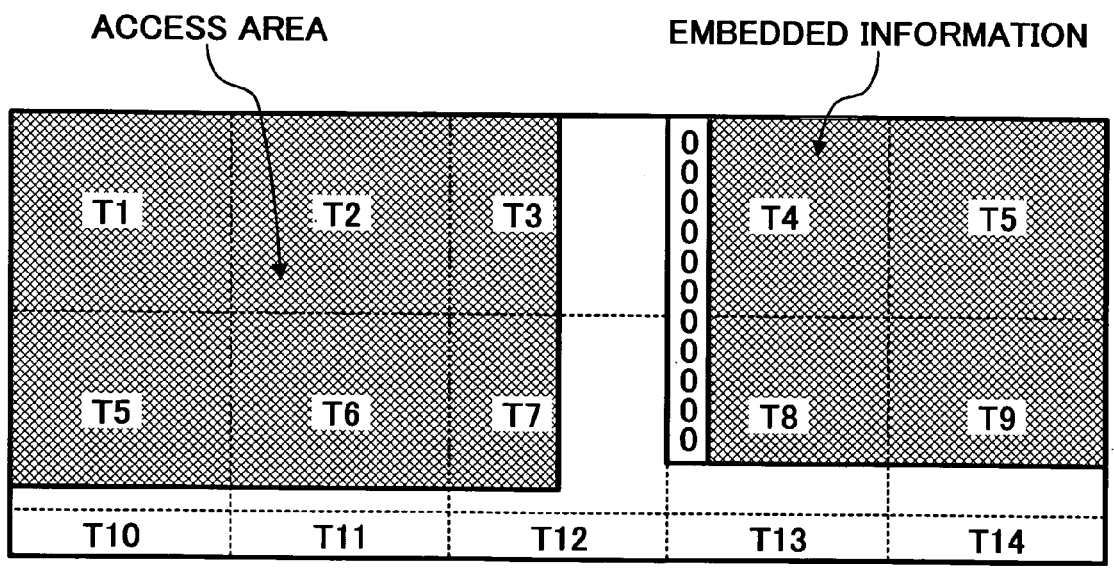
FIG. 35 is an example of the setting of the delimiter.

For example, as shown in FIG. 34, a delimiter can be set between the access area and the embed information in the third modification of the present embodiment. As shown in FIG. 35, a delimiter can be set to between the access area and the embed information in the fourth modification of the present embodiment.

The information embedding process at the time of performing tiling is explained in the second embodiment. In a sixth modification of the second embodiment, it can be determined whether tiling is to be performed for each image. In this case, information on whether tiling is to be carried out is obtained as image relevant information. The tiling unit 222 performs tiling when the image relevant information indicating that tiling is to be carried out is obtained.

Figure 36:
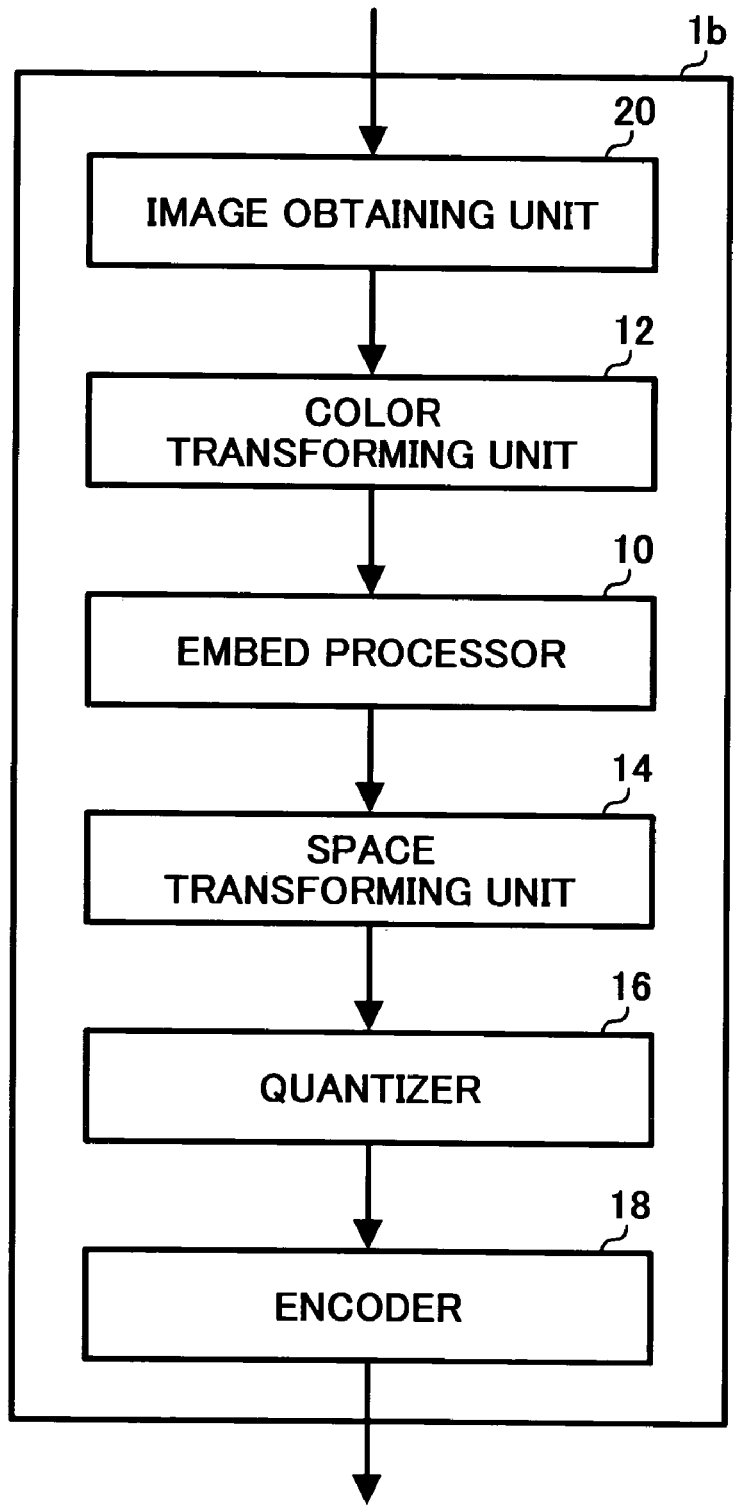
FIG. 36 is a functional block diagram of an image processing apparatus according to a third embodiment of the invention.

FIG. 36 is a functional block diagram of an image processing apparatus 1b according to a third embodiment of the present invention. The image processing apparatus 1b according to the third embodiment is different from those according to the first and the second embodiments in that information is embedded into a color-transformed image.

Figure 37:
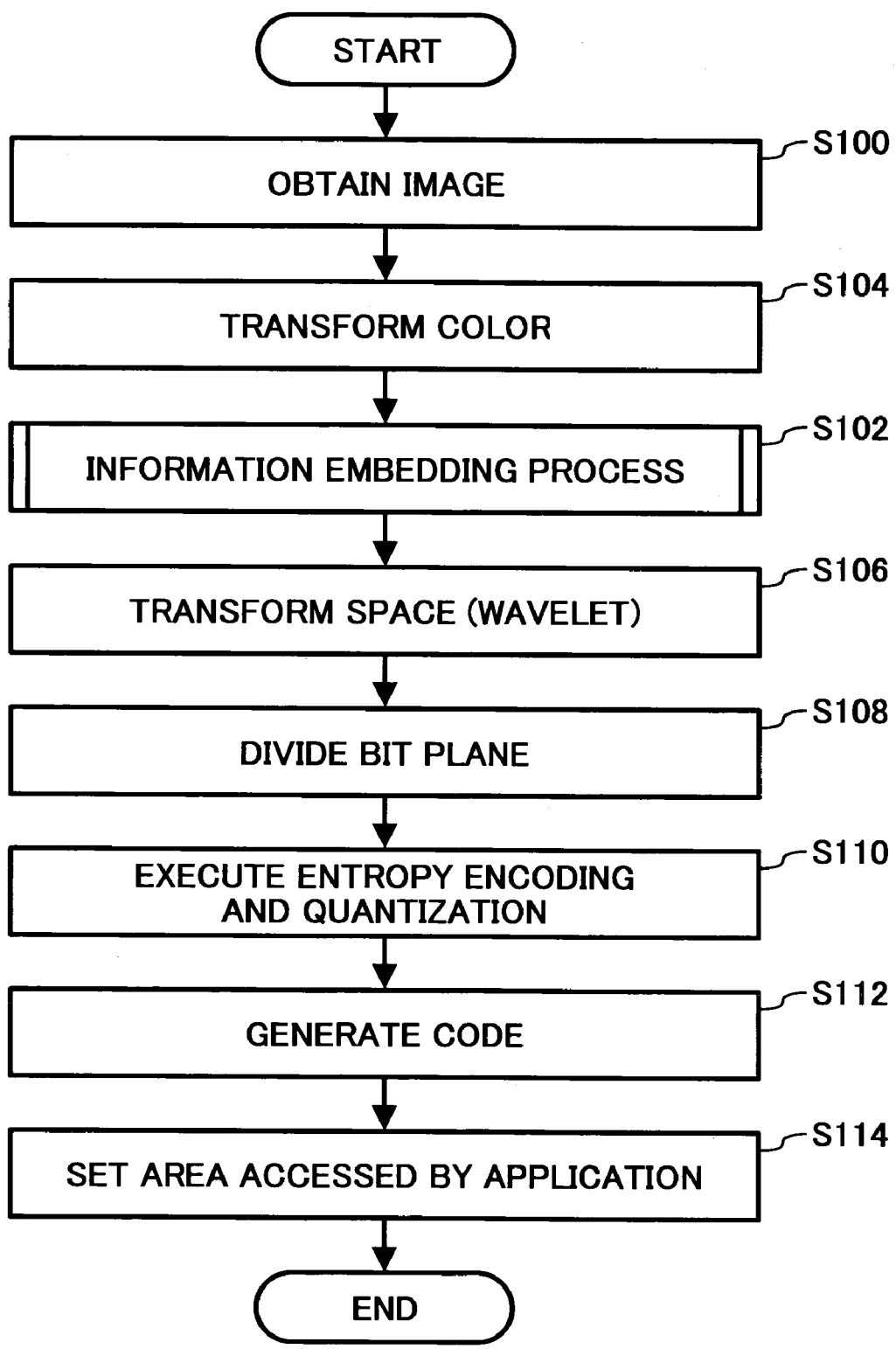
FIG. 37 is a flowchart of an image processing procedure carried out by the image processing apparatus shown in FIG. 36.

FIG. 37 is a flowchart of an image processing procedure performed by the image processing apparatus 1b according to the third embodiment. In the image processing apparatus 1b, when the image obtaining unit 20 obtains an image and image information from the external reader, the image processing apparatus 1b transforms the color of the image (step S104), and performs an information embedding process (step S102).

In the information embedding process carried out by the embed processor 10 according to the third embodiment, the embed-area determining unit 106 first determines a part of transformed color components into which information is to be embedded.

Figure 38:
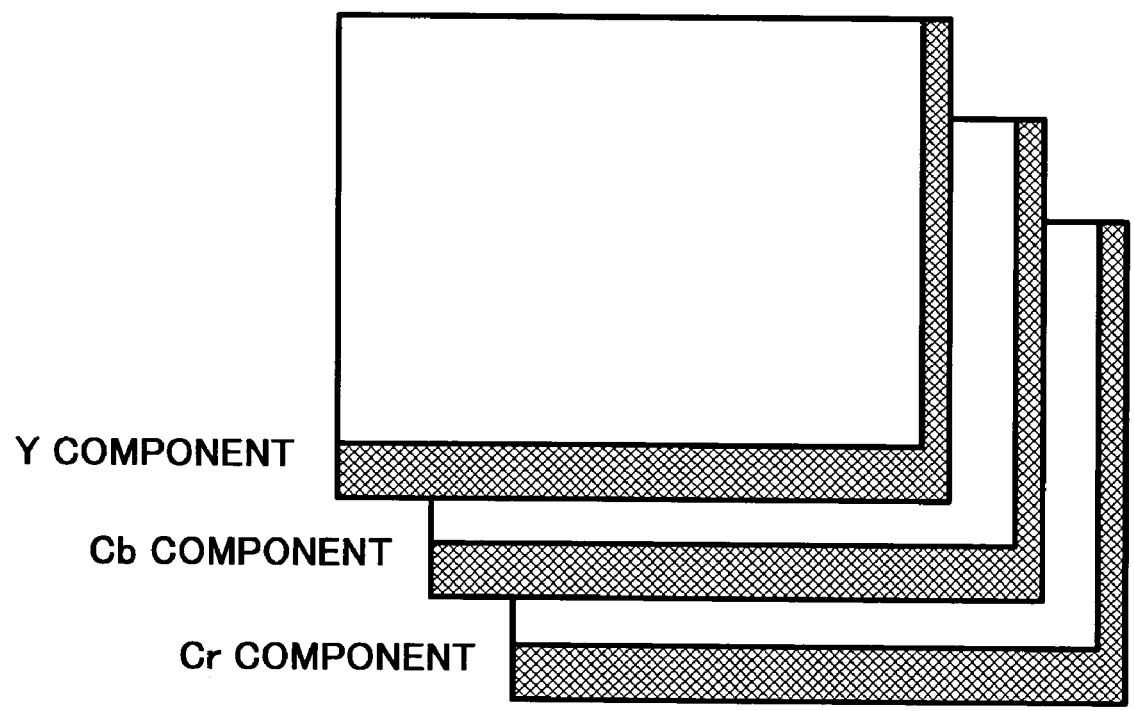
FIG. 38 depicts three color components.

As shown in FIG. 38, the image is transformed into three color components. More important information can be embedded into a brightness component than into a color difference component. For example, when the image is transformed into a monochromatic image, the color difference component is changed, however, the brightness component is maintained. Therefore, when the information is embedded into the brightness component, the embedded information can be prevented from being changed.

Specifically, the information can be embedded into only the brightness component, or can be embedded into other color components as well as the brightness component. A size of the embed area to be secured is different depending on the color component into which the information is to be embedded.

When a secured size is DIFF2, this DIFF2 is obtained from the following expression.

$$DIFF2=((\text{size of image})-(\text{size of access area}))-\alpha^*(\text{size of embedded information})$$

$$\alpha=(\text{total number of color components})/(\text{number of embedded color components}) \quad (6)$$

The DIFF2 is compared with "0", and the embed area is enlarged, in a similar manner to that when the DIFF1 is compared with "0" in the first embodiment.

After the information is embedded, an image is wavelet transformed (step S106). Other configurations and processing of the image processing apparatus 1b according to the third embodiment are similar to those of the image processing apparatus 1 according to the first and the second embodiments.

Figure 39:
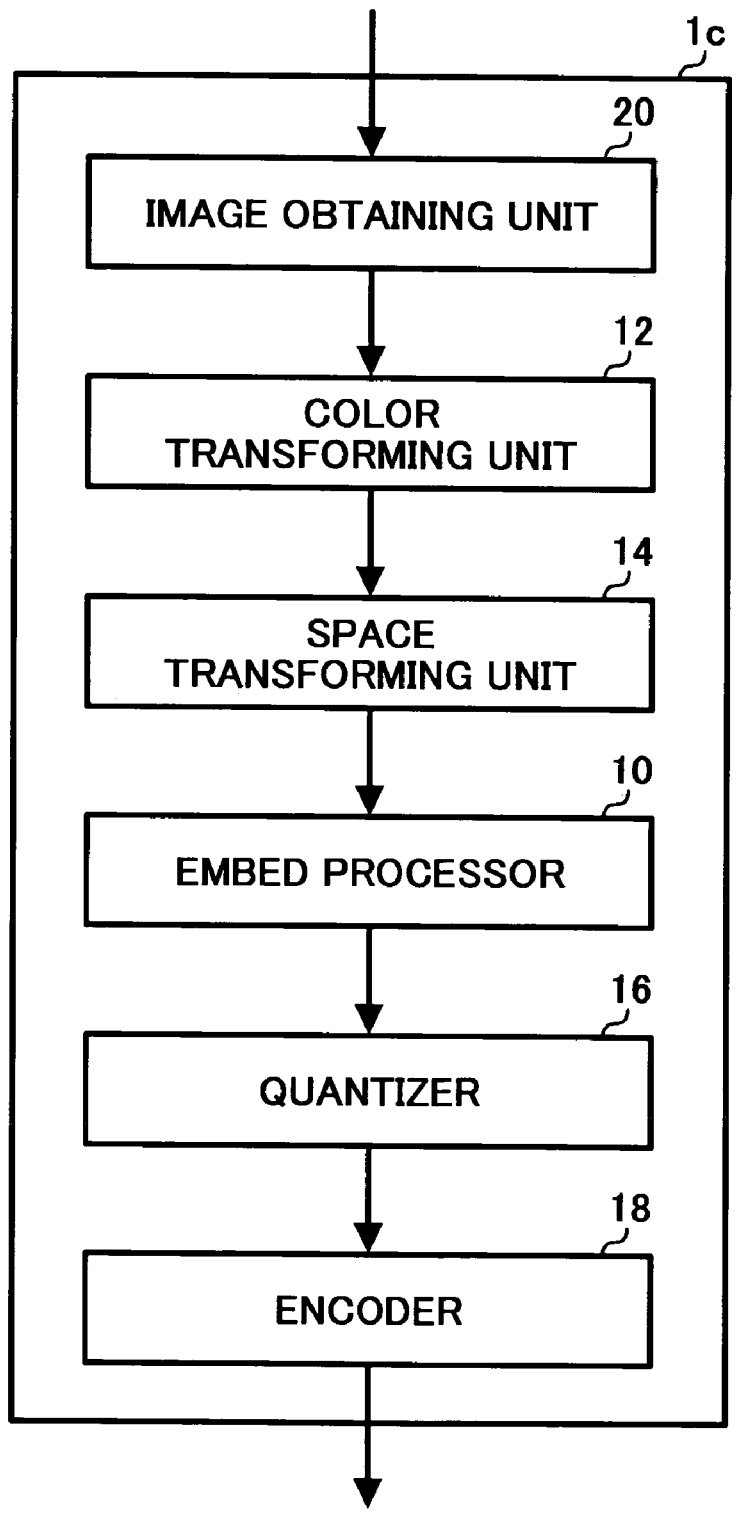
FIG. 39 is a functional block diagram of an image processing apparatus according to a fourth embodiment of the invention.

FIG. 39 is a functional block diagram of an image processing apparatus 1c according to a fourth embodiment of the present invention. The image processing apparatus 1c is different from those according to other embodiments in that information is embedded into a coefficient space after a space (wavelet) transform.

Figure 40:
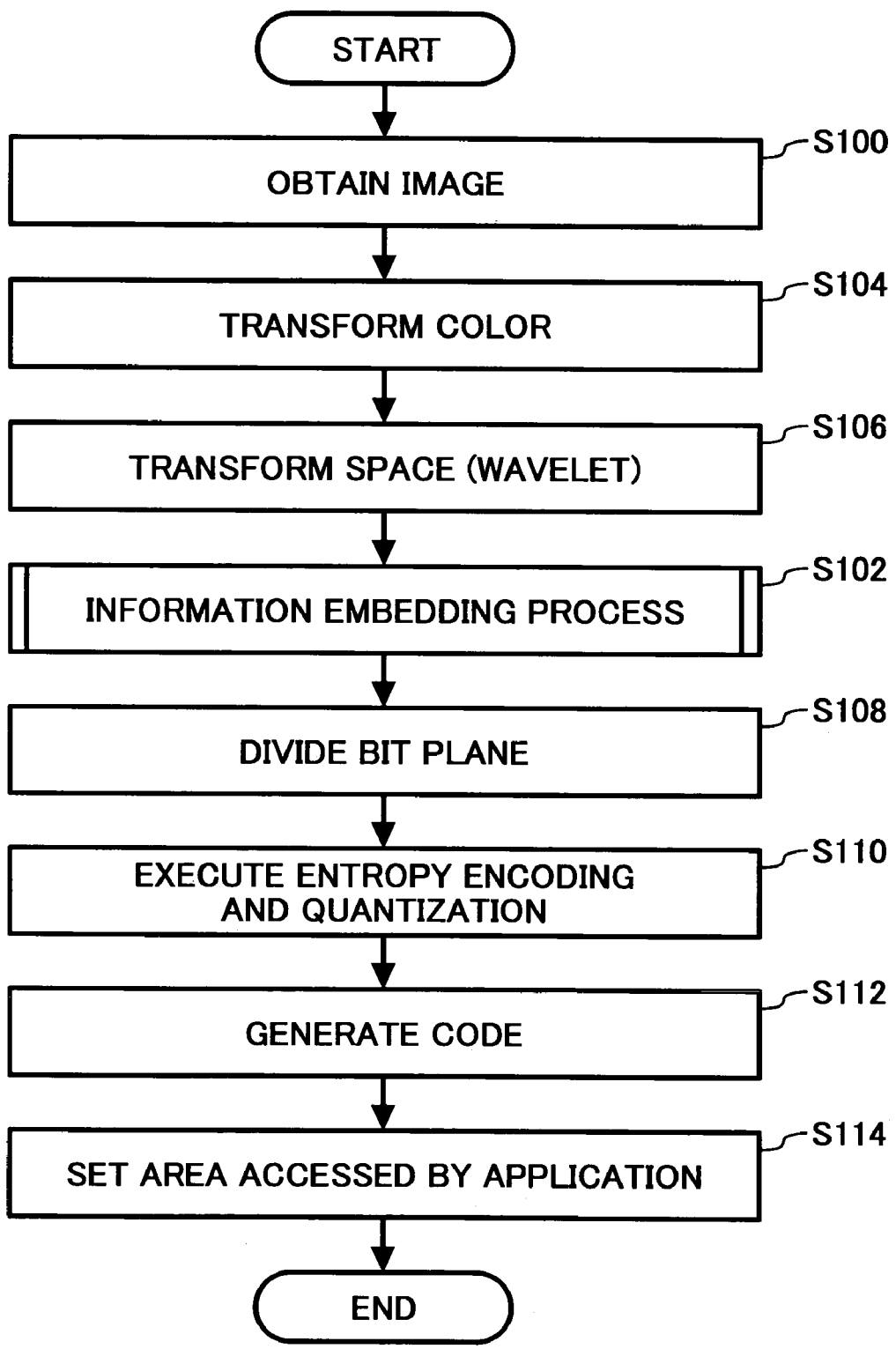
FIG. 40 is a flowchart of an image processing procedure carried out by the image processing apparatus shown in FIG. 39.

FIG. 40 is a flowchart of an image processing procedure performed by the image processing apparatus 1c according to the fourth embodiment. In the image processing apparatus 1c, when the image obtaining unit 20 obtains an image and image information from the external reader, the image processing apparatus 1c transforms the color of the image (step S104), and wavelet transforms the image (step S106). The image processing apparatus 1c performs an information embedding process to embed information into a coefficient space after the wavelet transform (step S102).

For the convenience of explanation, the wavelet transform is taken as an example. When there is a mechanism of changing the image size to control the embed area, the wavelet transform is not always necessary, and other space transform such as a discrete cosine transform (DCT) can be performed instead.

In the information embedding process, the image size (the encoding area) is enlarged according to need so that space for accommodating embed information can be secured. The secured size is obtained as DIFF3 from the following expression.

$$DIFF3=((\text{size of subband})-(\text{size of access area on each subband}))-\beta^*(\text{size of embedded information})$$

$$\beta=\beta1^*\beta2^*\beta3^*\beta4$$

$$\beta1=(\text{total number of color components})/(\text{number of embed color components})$$

$$\beta2=(\text{total number of subbands})/(\text{embed subband coefficient})$$

$$\beta3=4^{**}((\text{total number of hierarchies/number of embed hierarchies})-1)$$

$$\beta4=\text{total number of coding paths/number of embed coding paths} \quad (7)$$

The DIFF3 is compared with "0", and the embed area is enlarged, in a similar manner to that when the DIFF1 is compared with "0" in the first embodiment.

A variation in the information embedding position is determined by property information obtained as embed relevant information. The property information includes an embedding position, possibility of a divided embedding, importance, presence or absence of a region of interest (ROI), synchronization of an image area and an adjacent tile (code block) boundary, whether a wavelet transform coefficient is divided, various sizes of the divided wavelet transform coefficient, and a code block size.

A factor β1 is determined depending on a color component into which information is embedded. The factor β1 has the same meaning as that of α when embedding information into color component data after a color transformation in the second embodiment.

Figure 41:
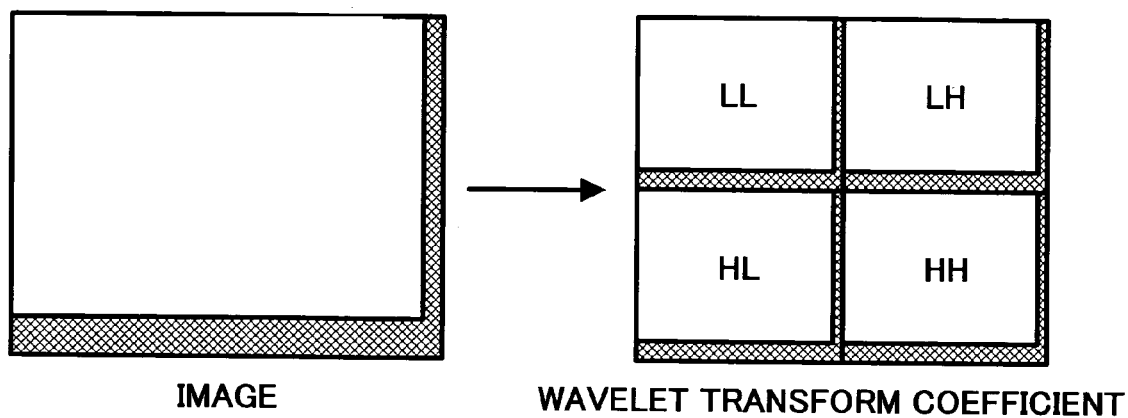
FIG. 41 is an example of embedding information into a right side or a lower side of an image.

FIG. 41 depicts an example of embedding information into a right side or a lower side of an image. A size of the image (the encoding area) is determined by increasing values of Xsiz and Ysiz. Important information is embedded into a low-frequency subband obtained by the wavelet transform. Which embed information is more important is determined based on the importance contained in the embed relevant information. Preferably, a low-frequency subband is determined as the embed area with priority. When the subband into which information is embedded is determined, a value of β2 is determined.

Figure 42:
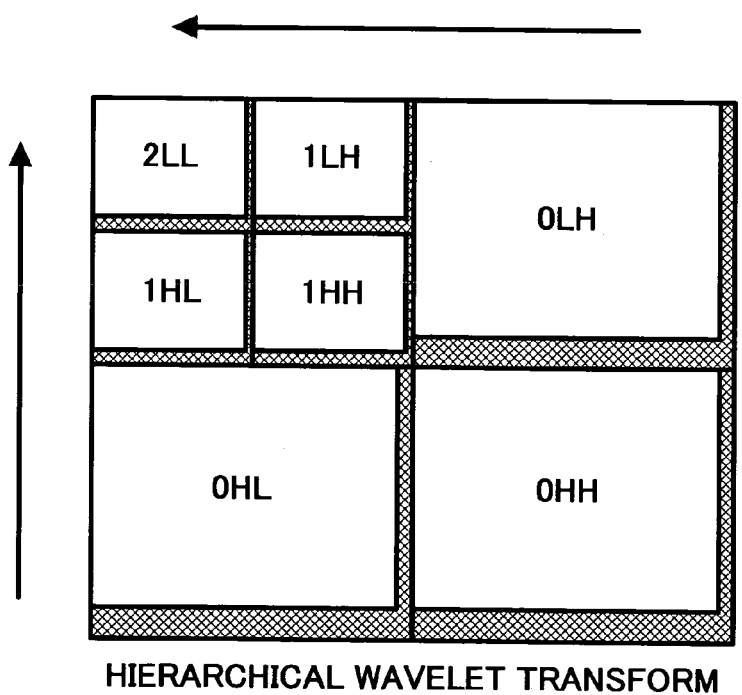
FIG. 42 is an example of embedding more important information into a higher wavelet transform coefficient than into a lower wavelet transform coefficient.

A hierarchical wavelet transform can be carried out, in which case, more important information is embedded into a higher wavelet transform coefficient than into a lower wavelet transform coefficient as shown in FIG. 42. Preferably, a higher wavelet transform coefficient is determined as the embed area with priority. A ratio of an area to be secured for embedding to the embed hierarchy is a value indicated by β3.

Figure 43:
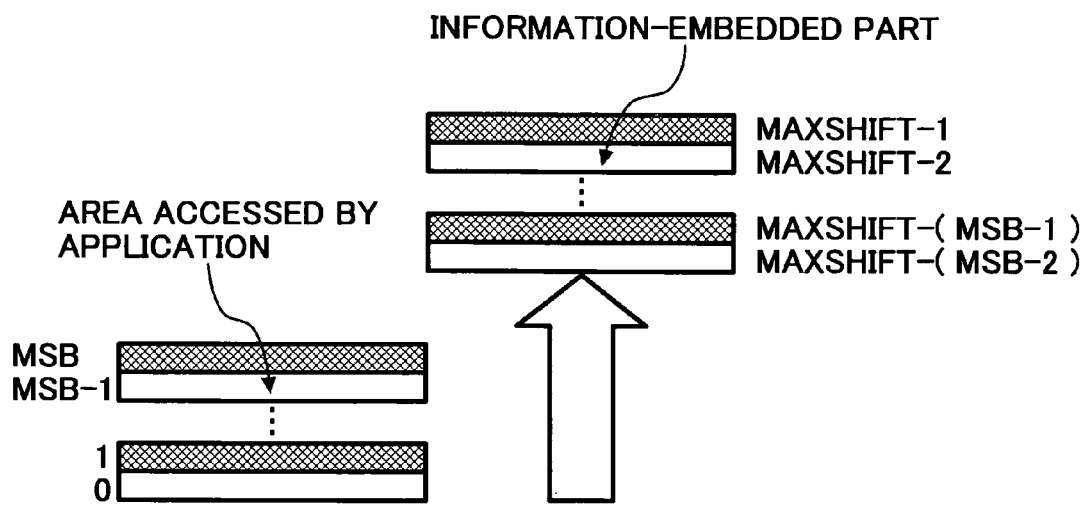
FIG. 43 is an example of embedding much information in the embed area up to a maximum number of bit planes permitted by a wavelet transform coefficient space relative to an area accessed by an application, as one method of placing importance.

As shown in FIG. 43, as one of methods of placing importance, an embed area can be shifted up, relative to the area accessed by an application, according to a MAXSHIFT system up to a maximum number of bit planes permitted by the wavelet transform coefficient space. In the format in which the information-embedded part is shifted up, it is clear that corresponding bit planes are located at a higher position as compared with a format in which the information-embedded part is not shifted up.

In the subsequent process of post quantization, bit planes are sequentially quantized from the lower bit plane. Therefore, when embedded information is located at a higher position, this embedded information has large tolerance against quantization.

The MAXSHIFT is a basic system of ROI that includes the following encoding process.

1. Prepare mask information indicating a coefficient of ROI
2. Determine a shift amount (s)
3. Shift the coefficient to the MSB side by s bits
4. Shift the coefficient of no ROI to the LSB side by s bits based on the mask information
5. Describe the number of shifted bits (s) into the RGN marker
6. Perform a normal arithmetic processing On the other hand, at the decoding time, it is determined whether the coefficient is an ROI-processed coefficient, using a characteristic that the dynamic range of the ROI-processed coefficient is larger than a predicted dynamic range. The MAXSHIFT is described in the Annex H of the IS15444-1 JPEG2000 Part1.

The MAXSHIFT is carried out to avoid damaging the information-embedded area when a bit plane quantization occurs at a later stage. Whether the information-embedded area is to be shifted up is determined based on the property information included in the embed relevant information.

Figure 44:
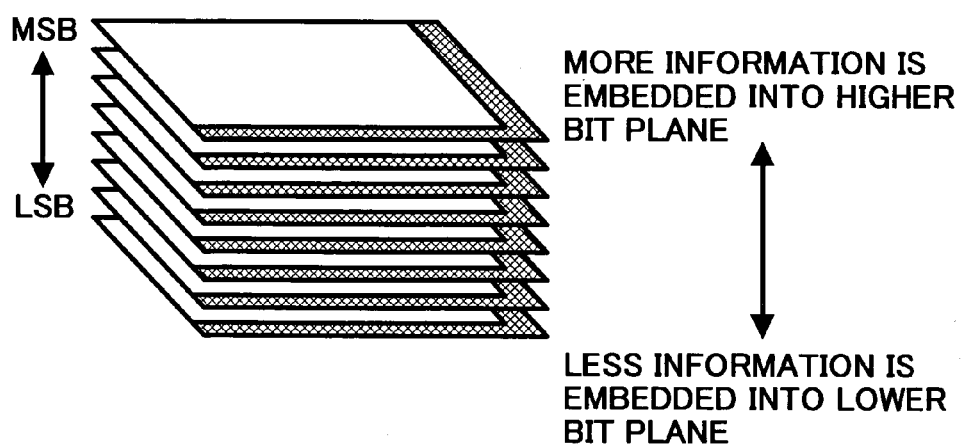
FIG. 44 is an example of occurrence of a bit plane quantization.

FIG. 44 is an example of occurrence of a bit plane quantization. In this case, a higher bit plane contains more information than a lower bit plane. Preferably, more important information is embedded into a higher bit plane. It is also preferable that a higher bit plane is determined as the embed area with priority.

Figure 45:
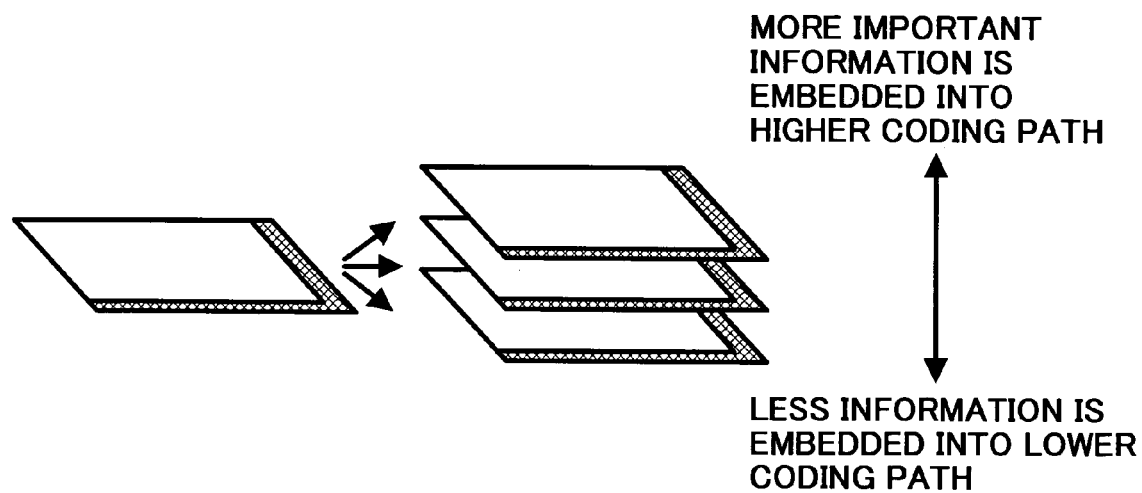
FIG. 45 depicts a system of dividing one bit plane into plural coding paths.

FIG. 45 depicts a system of dividing one bit plane into plural coding paths. In this case, important information is embedded into a higher coding path than into a lower coding path. Preferably, more important information is embedded into a higher coding path. It is also preferable that a higher coding path is determined as the embed area with priority. A ratio of an area to be secured for embedding to the coding path is a value indicated by β4.

An information-embedding position is determined based on embed relevant information. Specifically, the information-embedding position is determined based on a hierarchical position of embedding an embed subband coefficient and a wavelet transform coefficient, and a position of an embed bit plane and a coding path. A subband size is enlarged, and this size is reflected in Xsiz and Ysiz.

Figure 46:
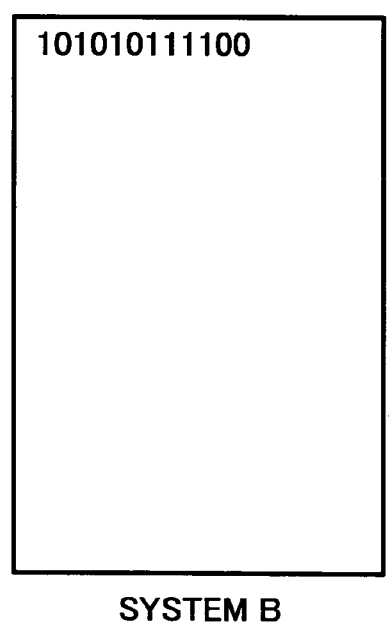
FIG. 46 is an explanatory diagram of continuously embedding information into one bit plane.

As shown in FIG. 46, a byte stream is continuously encoded into one bit plane, without dividing the byte stream into plural bit planes. Bits are also allocated continuously to coding paths on one bit plane.

Figure 47:
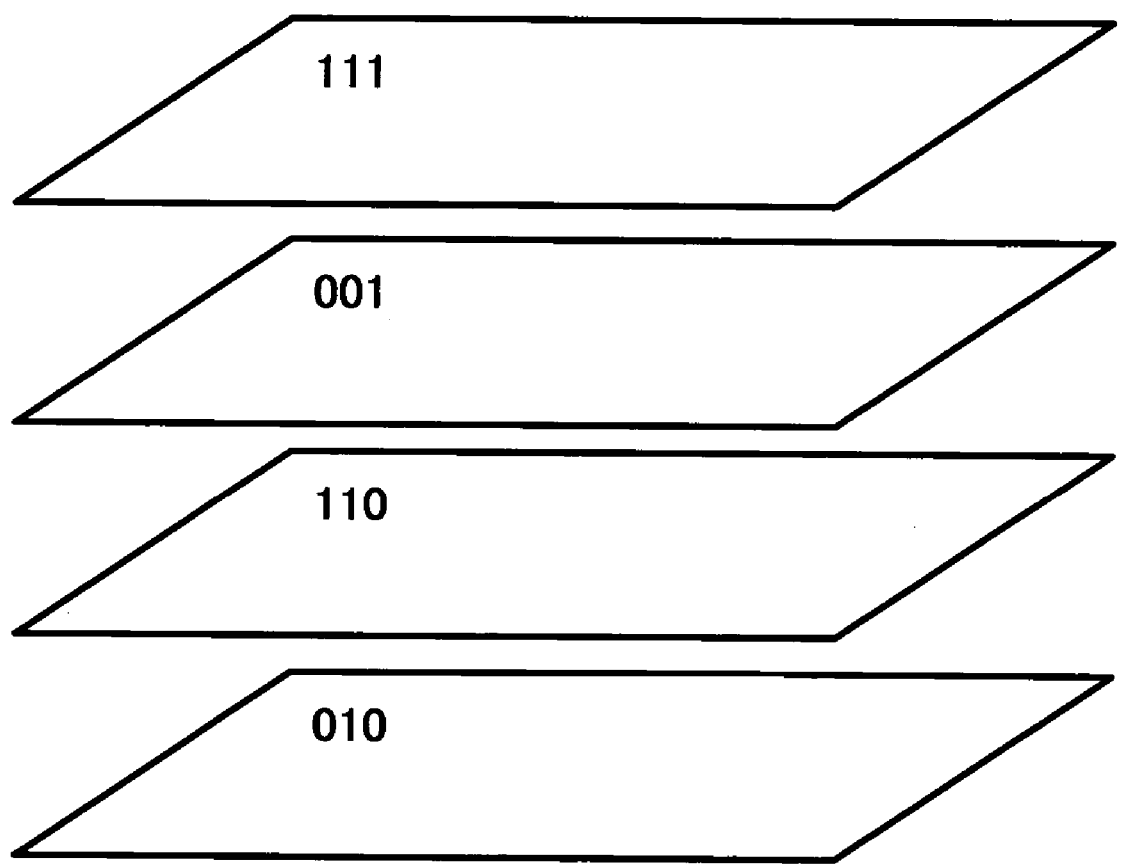
FIG. 47 is an explanatory diagram of a normal bit plane encoding.

As shown in FIG. 47, while in the normal bit plane encoding, bits within a byte belong to separate bit planes, quantization is carried out for each bit plane when a bit plane is quantized. Therefore, even when one piece of bit plane is quantized, the bits cannot be recovered.

Therefore, as shown in FIG. 46, a byte stream is continuously encoded into one bit plane, without dividing the byte stream into plural bit planes. In this case, eight times of the value of β is necessary based on the ratio of bytes/bit.

Figure 48:
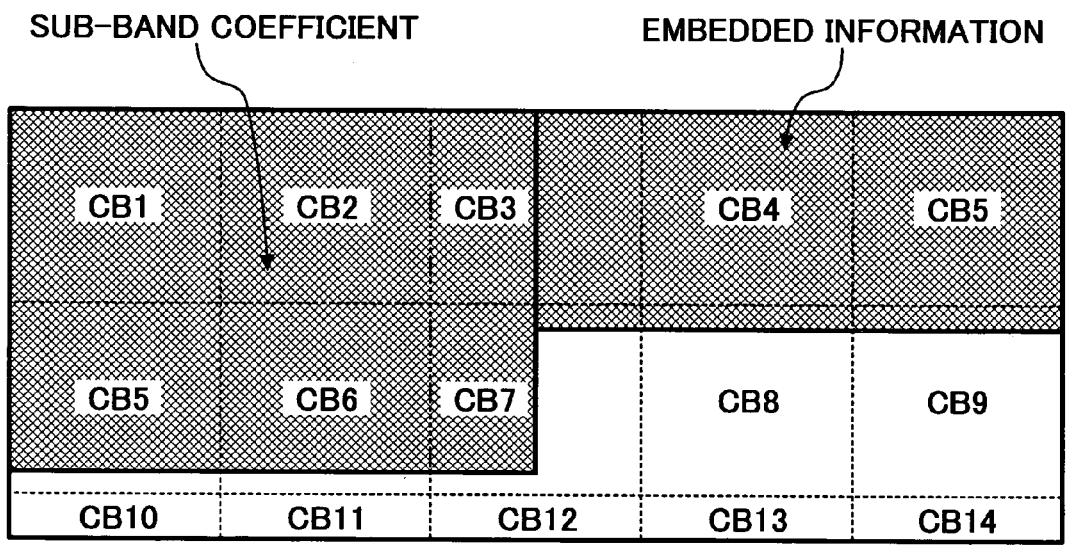
FIG. 48 is an example of matching a starting point of embedded information with a boundary of an area accessed by an application with each subband coefficient at the time of dividing a code block.
Figure 49:
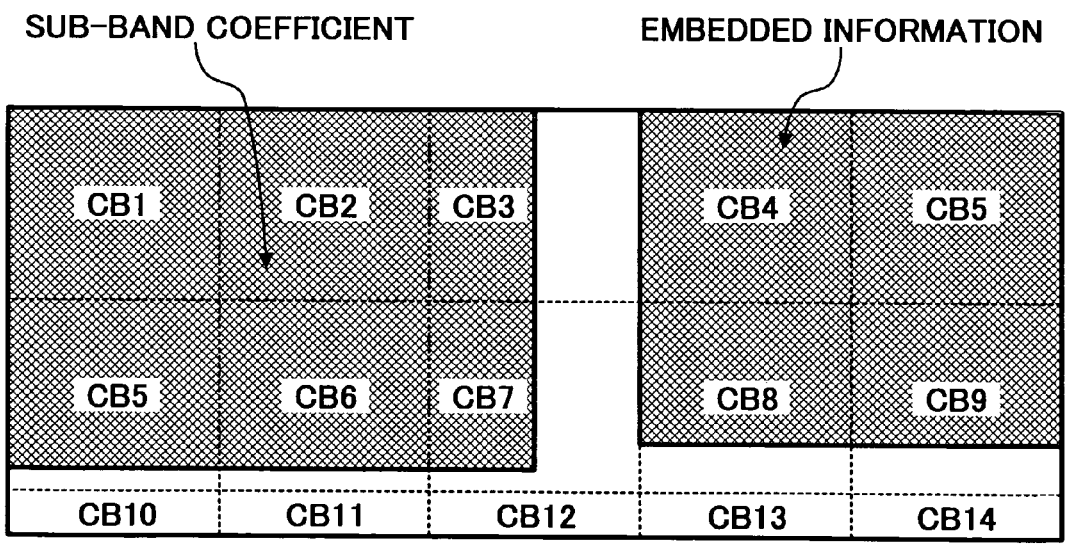
FIG. 49 is an example of matching a starting point of embedded information with a code block boundary.

As shown in FIG. 48, a starting point of embed information can be coincided with a boundary of an area accessed by an application using subband coefficients at the time of dividing a code block, based on property information synchronous with a wavelet transform coefficient area and an adjacent code block boundary obtained as embed relevant information. Alternatively, as shown in FIG. 49, a starting point of embed information can be coincided with a code block boundary.

In this case, at the time of calculating the embed area DIFF3, code blocks belonging to the right end and the lower end of subband coefficients corresponding to the area accessed by an application are rounded to a code block size as a size necessary for the embedding.

Relating information does not necessarily mean to make the starting point coincide with the boundary. For the convenience of managing embed information, an offset value determined in advance can be embedded.

Figure 50:
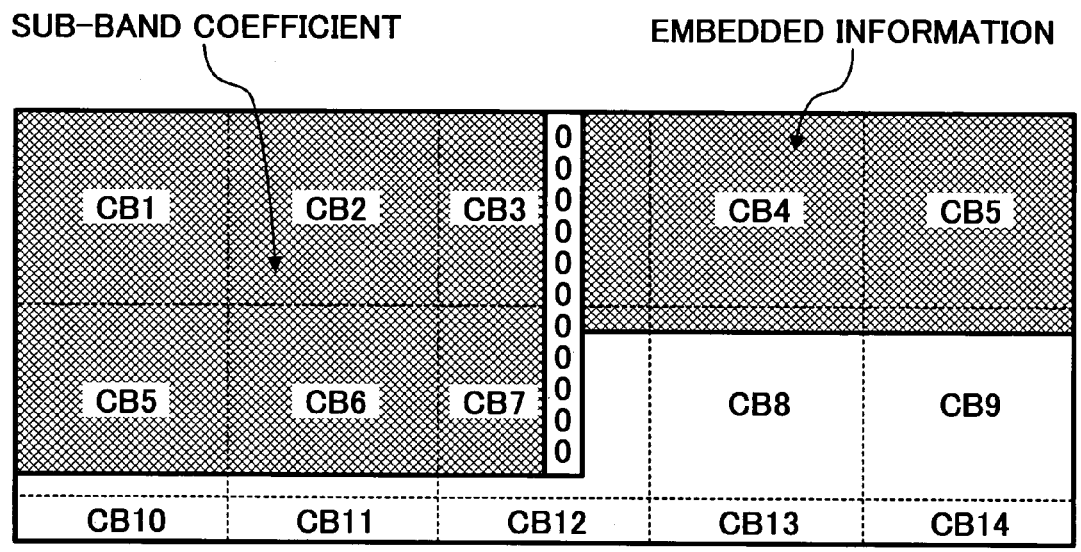
FIG. 50 is an example of the setting of the delimiter.
Figure 51:
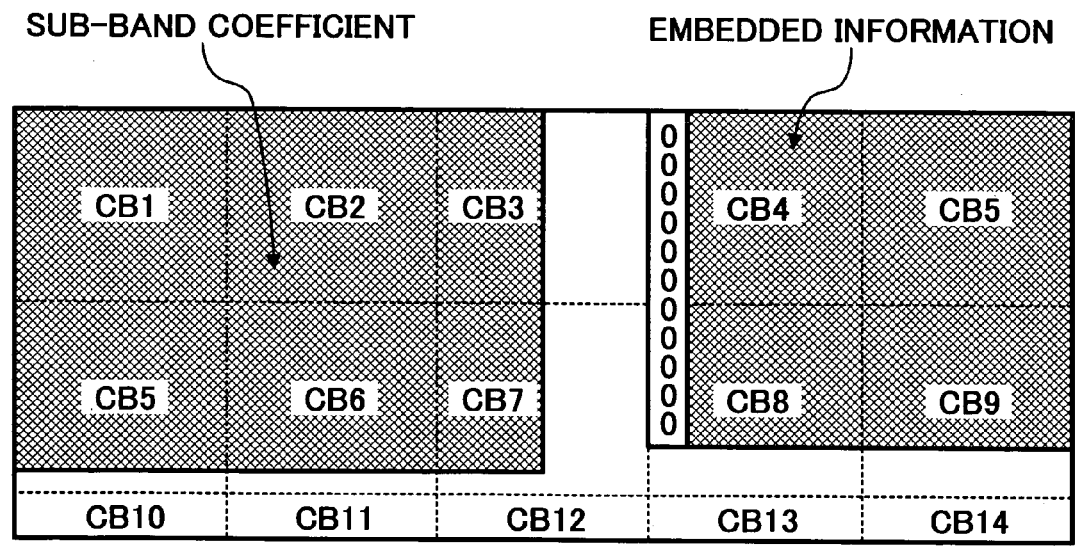
FIG. 51 is an example of the setting of the delimiter.

For example, in the above two cases, instead of embedding the starting point with the offset value zero at a boundary corresponding to an area accessed by an application or a code block boundary, a constant value (for example, zero) can be set as a delimiter to separate two areas as shown in FIG. 50 and FIG. 51.

With the above embodiment, even when the frequency distribution of the appearance of a bit pattern corresponding to an area accessed by an application is different from the frequency distribution of the appearance of a bit pattern of the embed area, the contexts of the bit patterns of the two areas prescribed in the IS15444-1 Annex D. D.3.1 FIG. D-2 can be separated. By carrying out the above operation, information can be embedded into a secured embed area.

Figure 52:
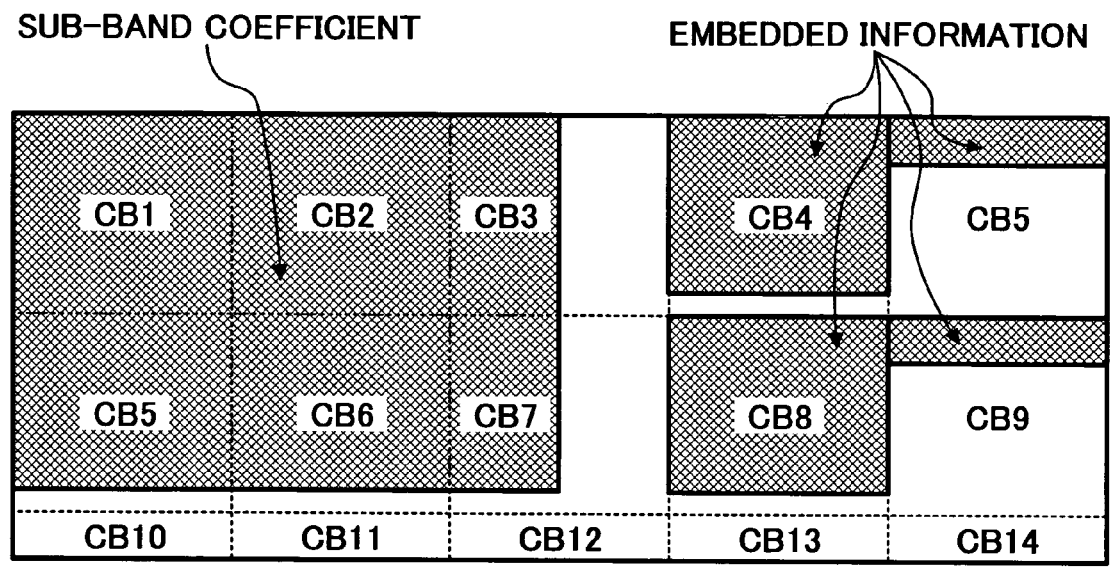
FIG. 52 is an example of embedding plural pieces of information by relating the information to each code block.
Figure 53:
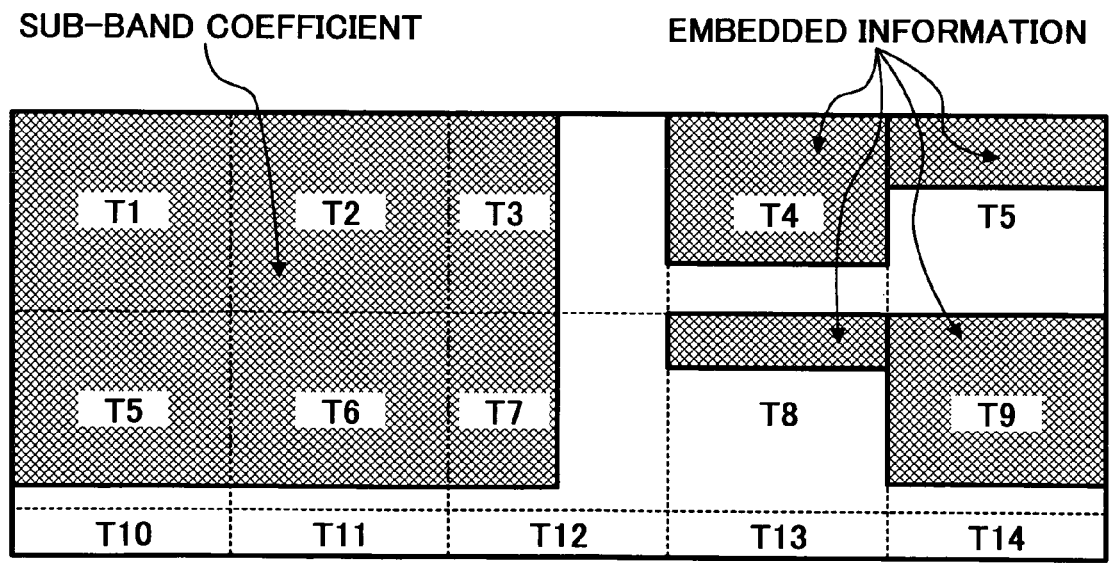
FIG. 53 is an example of embedding plural pieces of information by relating the information to each tile.

Alternatively, plural pieces of embed information can be embedded by relating the information to each code block as shown in FIG. 52. Alternatively, plural pieces of information can be embedded by relating the information to each tile as shown in FIG. 53.

The above explanation is based on a configuration of an encoder of the JPEG2000. The invention can be also applied to another encoding system that constitutes a mechanism of setting an encoding area independently of an area accessed (display or print) by an application.

Figure 54:
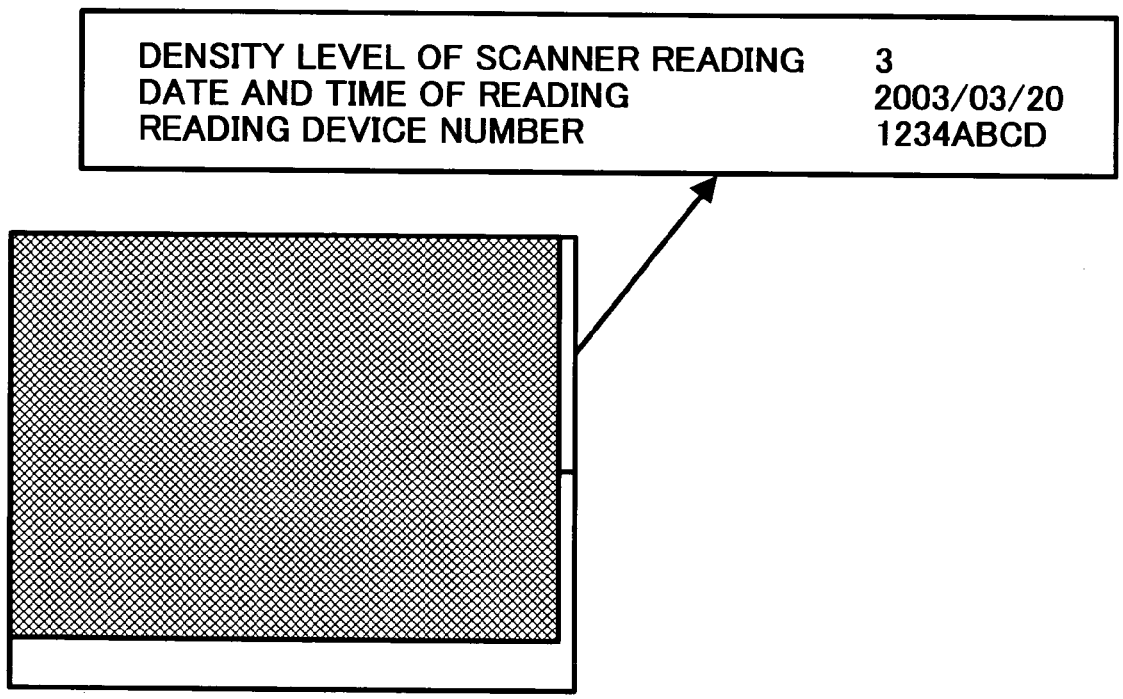
FIG. 54 depicts embedded information according to an example 1.

FIG. 54 depicts embedded information according to an example 1. The embed information includes (1) a density level of an image read from a scanner, (2) a reading date and time, and (3) an embed area of embedding document specific information such as a reading device number into an image. This embed information has a relatively small amount of information.

Figure 55:
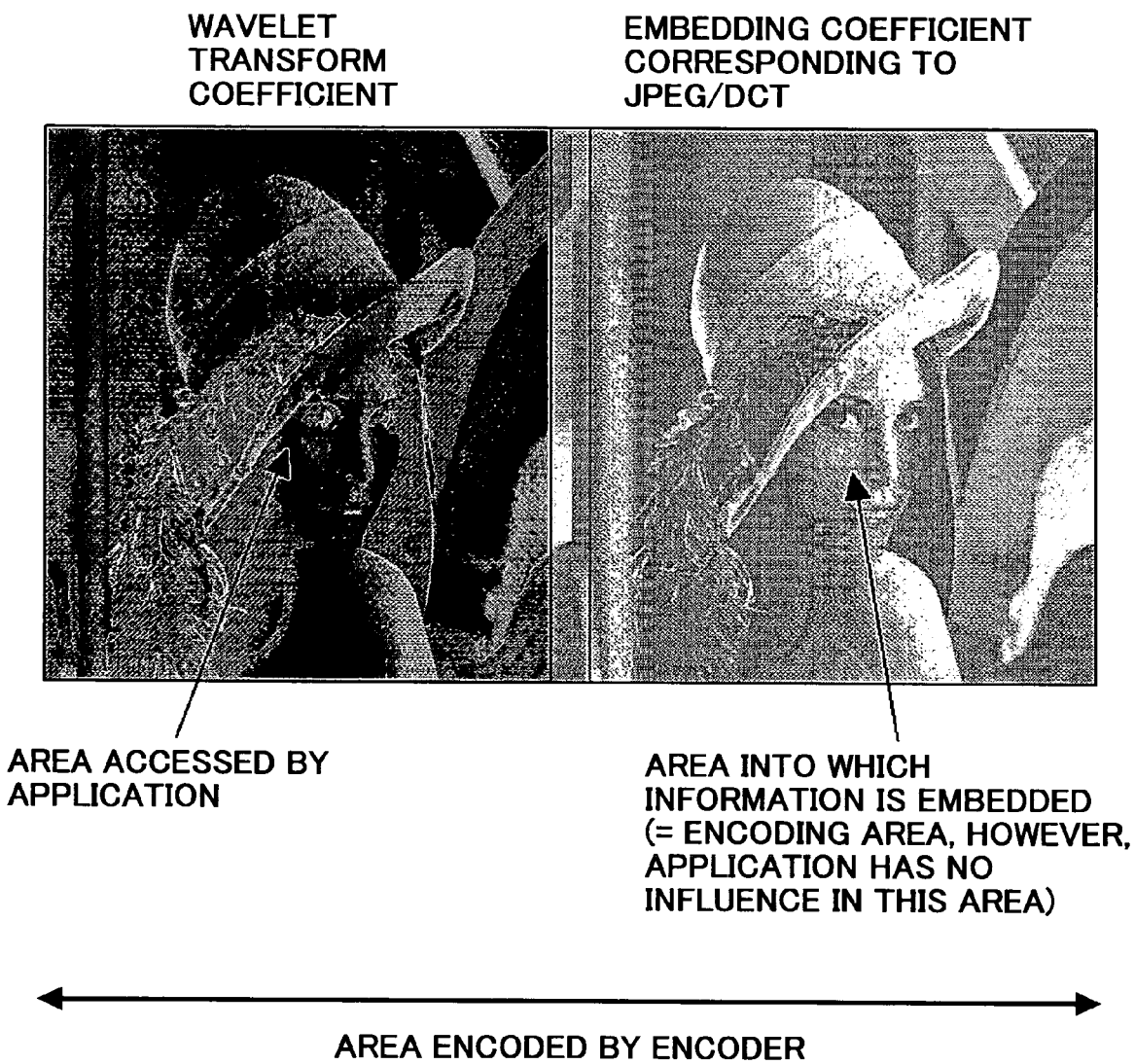
FIG. 55 depicts embedded information according to an example 2.

FIG. 55 depicts embedded information according to an example 2. The embed information includes an image encoded in an encoding algorithm equivalent to an image of the area accessed by an application and different in a quantization rate.

With this embodiment, there is provided a mechanism of easily comparing relative merits of encoding algorithms using a pair comparison method when the same input image is encoded using different encoding algorithms. This embed information has a relatively large amount of information.

Figure 56:
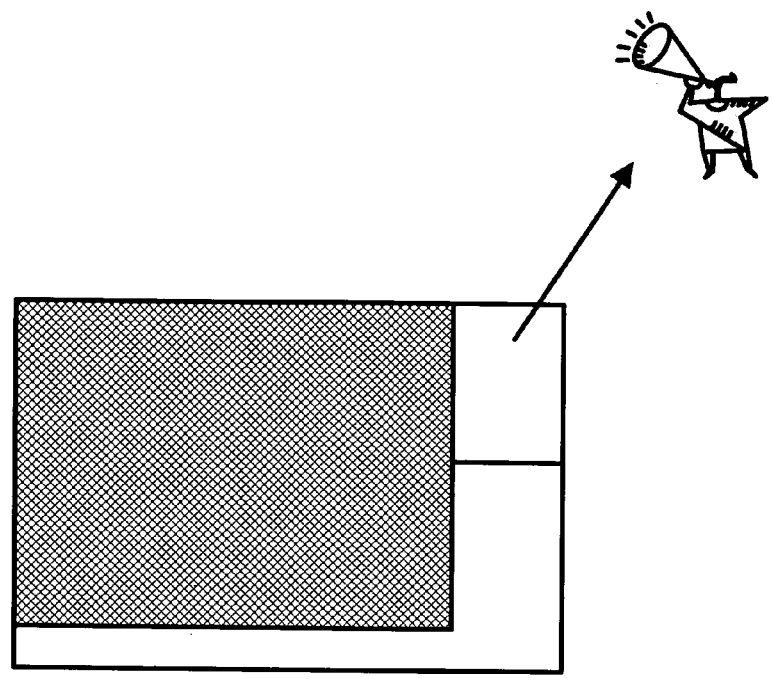
FIG. 56 depicts embedded information according to an example 3.

FIG. 56 depicts embedded information according to an example 3. The embed information includes audio information for illustrating an image with a voice. This embed information has an intermediate amount of information.

Figure 57:
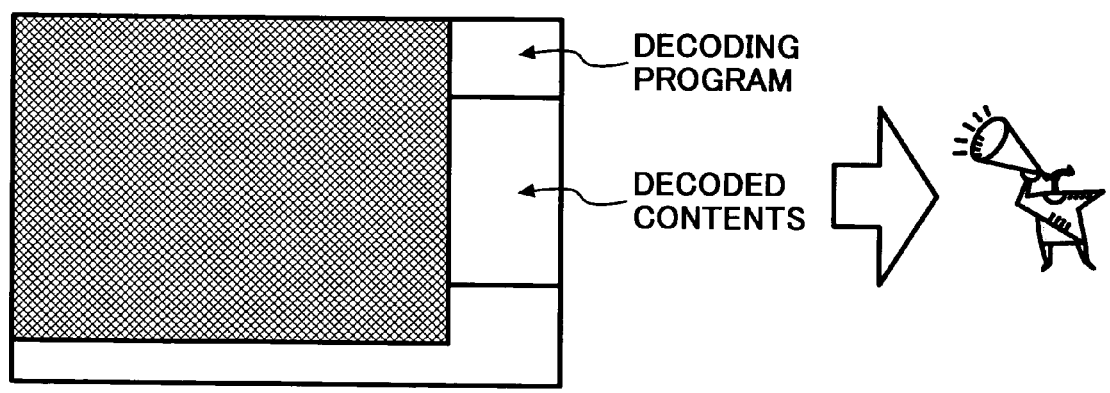
FIG. 57 depicts embedded information according to an example 4.

FIG. 57 depicts embedded information according to an example 4. Plural pieces of information are embedded in one image. The embed information includes contents (an image, voice, etc.) to be decoded, and a decoding program necessary to decode the contents to raw data.

Figure 58:
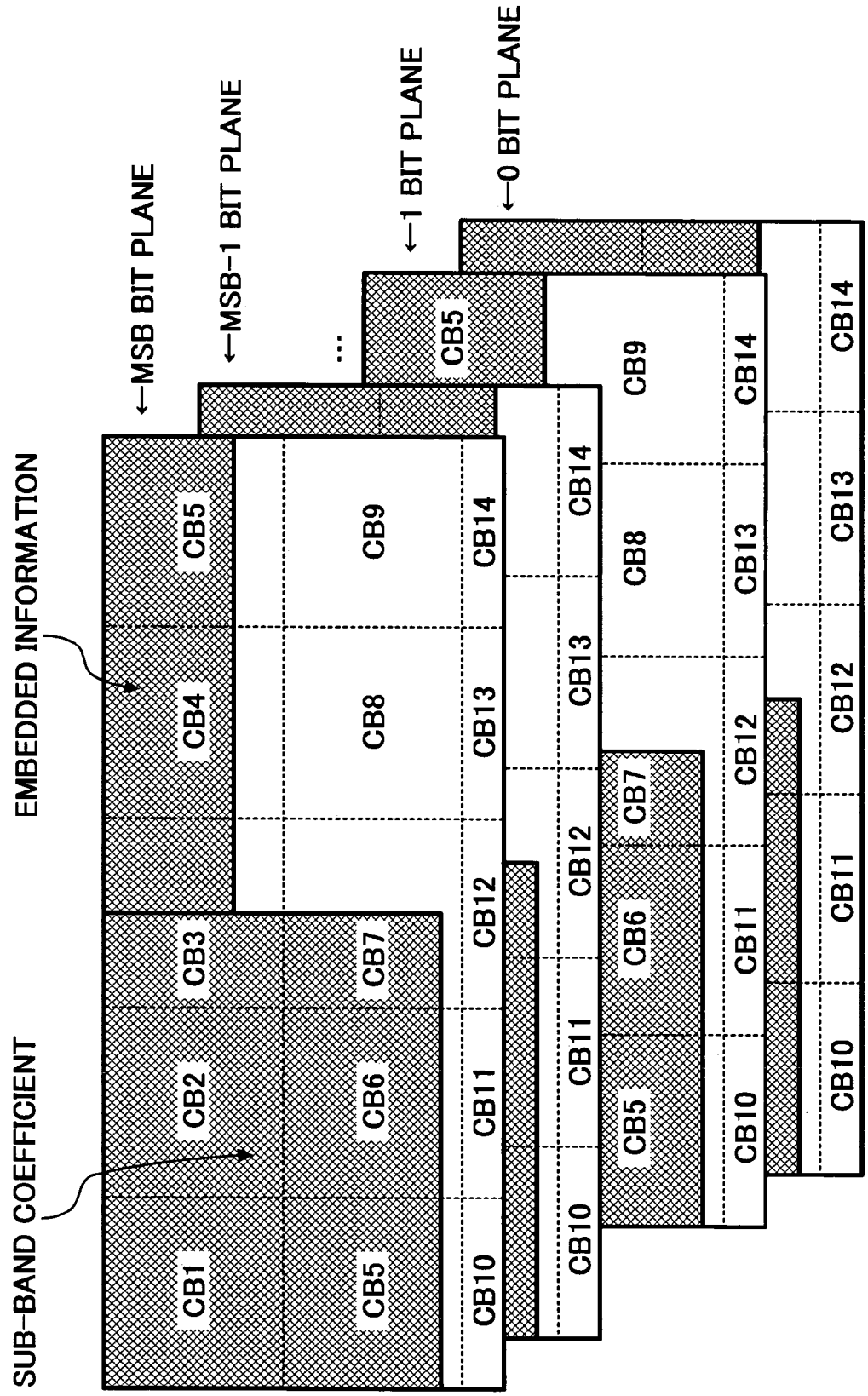
FIG. 58 depicts embedded information according to an example 5.

FIG. 58 depicts embedded information according to an example 5. The embed information includes plural pieces of information by relating the information to each bit plane. In this case, by simultaneously reproducing information of plural voice channels, n-dimensional stereo sound can be embedded.

Figure 59:
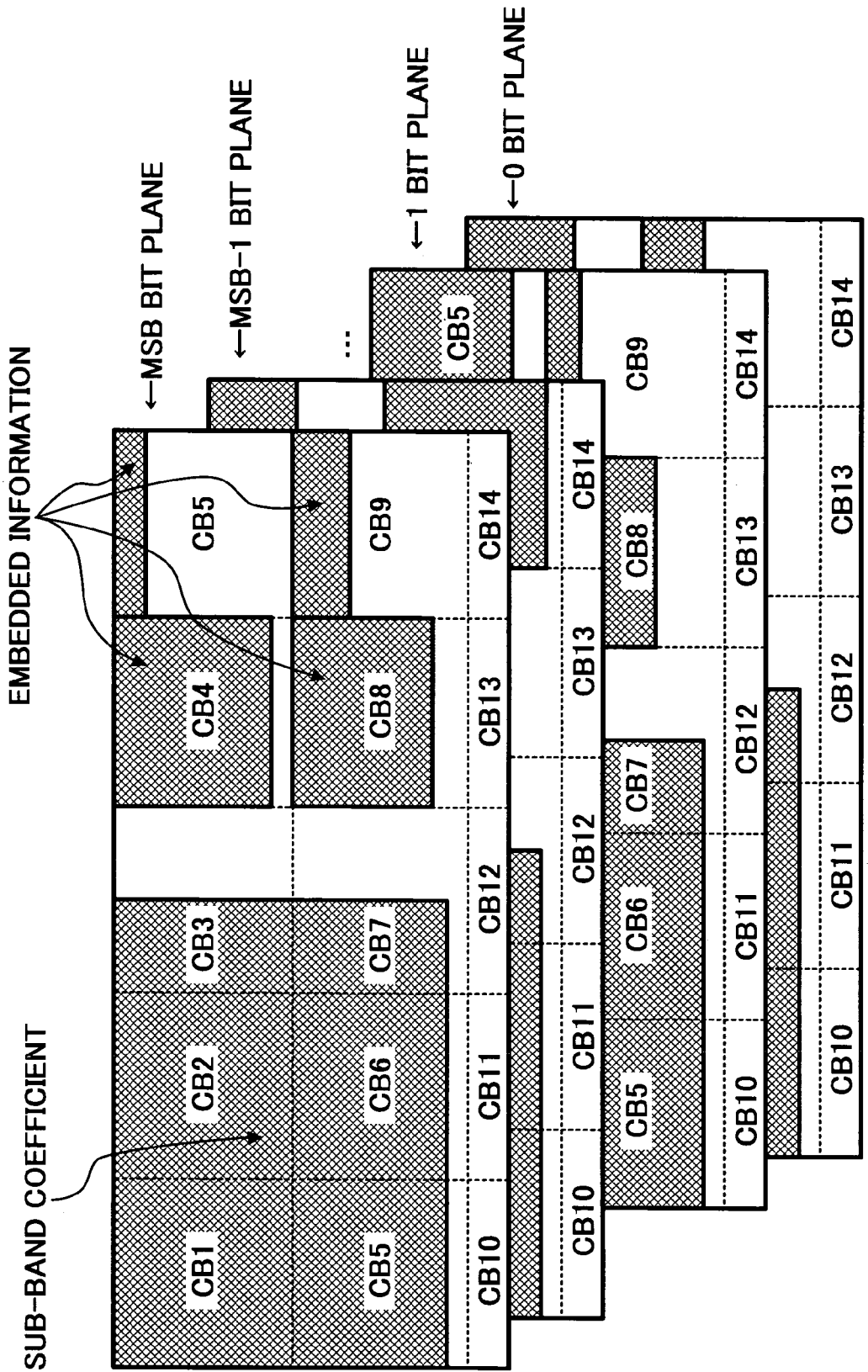
FIG. 59 depicts embedded information according to an example 6.

FIG. 59 depicts embedded information according to an example 6. The embed information includes one piece of information corresponding to each one code block so that many pieces of short information can be accessed at random.

In this case, information embedded into an optional code block is encoded independently, thereby constituting a packet. Therefore, this method is particularly effective when information having mutually strong relations in vertical and horizontal directions is entered in a spread sheet in a data embodiment like that of EXCEL and also when the data is used at random.

According to one embodiment of the present invention, when the application instructs an encoding, not only an area accessed by the application in the normal operation but also an area embedded with information can be also encoded in the same algorithm as if the information-embedded area is image data. Even when data is encoded in the same manner as that for image data, since the data is embedded in the area other than the access area, the data can be prevented from being tampered. Increase in the size of the image data can be restricted. The application can securely manage these data independently. Therefore, highly reliable operation can be carried out.

Furthermore, according to one embodiment of the present invention, an embed area suitable for the size of the embed information can be secured.

Moreover, according to one embodiment of the present invention, information can be embedded into the embed area after the space transformation which is less affected by quantization. At the same compression rate, information can be prevented from being damaged as compared with information which is embedded into an image before the space transformation.

Furthermore, according to one embodiment of the present invention, information embedding position can be localized into LL subbands having high integration of energy. Consequently, information can be prevented from being damaged.

Moreover, according to one embodiment of the present invention, encoding and decoding can be compatible, and the same result can be reproduced using devices manufactured by different manufacturers.

Furthermore, according to one embodiment of the present invention, the size of the embed area into which information is to be embedded can be increased limitlessly.

Moreover, according to one embodiment of the present invention, the access area can be easily separated from the embed area.

Furthermore, according to one embodiment of the present invention, information can be embedded into an area other than an access area in the tiled image, and data can be prevented from being tampered.

Moreover, according to one embodiment of the present invention, information can be embedded into the upper tiled area.

Furthermore, according to one embodiment of the present invention, information can be embedded into the left-side tiled area.

Moreover, according to one embodiment of the present invention, even when embed information has a large size, all the information can be embedded by dividing the information.

Furthermore, according to one embodiment of the present invention, when embed information can be divided, all the information can be embedded by dividing the information, even when the embed information has a large size.

Moreover, according to one embodiment of the present invention, since the information is embedded by dividing the information into units of embed information, the embedded information can be read out easily.

Furthermore, according to one embodiment of the present invention, embedded information can be prevented from being damaged.

Moreover, according to one embodiment of the present invention, from the viewpoint of a frequency distribution of the appearance of data, at the time of embedding information having a highest frequency in the center, entropy can be increased when the compression rate is the same by quantization.

Furthermore, according to one embodiment of the present invention, in the process of entropy coding, different kinds of information sources can be decreased, and the encoding amount can be decreased. The embed information can be accessed at random in a coded state. In other words, a target embed area can be accessed without expanding all areas including areas other than the target embed area. Consequently, only the target embed area can be partially encoded at a high speed.

Moreover, according to one embodiment of the present invention, the amount of encoding can be decreased. The access area can be easily separated from the embed area.

Furthermore, according to one embodiment of the present invention, at the time of accessing a target embed area for editing, only the target embed area can be partially encoded at a high speed, without expanding areas other than the target embed area and then re-compressing the whole area.

Moreover, according to one embodiment of the present invention, only an embed area in each of plural fine logic units can be partially accessed at random at a high speed.

Furthermore, according to one embodiment of the present invention, the embed information can be managed based on the importance of protecting the embed information from quantization.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processing apparatus comprising:

a determining unit to determine an embed area of an image, wherein the embed area is within an area of the image that is not accessed by an application that uses an access area of the image;

an embedding unit to embed at least one piece of embed information into the embed area determined by the determining unit, wherein the embedding unit enlarges the embed area by an enlargement amount to accommodate the at least one piece of embed information when the at least one piece of embed information is too large to be embedded into the embed area, and wherein the enlargement amount is determined by subtracting a size of the at least one piece of embed information from a difference between a size of the image and a size of the access area of the image that is accessed by the application;

a quantizer to quantize the image embedded with the at least one piece of embed information; and an encoder to encode the image quantized by the quantizer.

2. The image processing apparatus according to claim 1, wherein the determining unit determines the embed area based on a size of the image.

3. The image processing apparatus according to claim 1, wherein the determining unit determines the embed area based on a size of the at least one piece of embed information.

4. The image processing apparatus according to claim 1, wherein the encoder encodes the image based on JPEG2000.

5. The image processing apparatus according to claim 1, wherein the determining unit rewrites a size of an encoding area stored in an Image Header Box of a file format prescribed in IS15444-1 JPEG2000 Part 1 into a size of an encoding area including the embed area.

6. The image processing apparatus according to claim 5, wherein the determining unit rewrites a size in a horizontal direction (Xsiz) of the encoding area including the embed area.

7. The image processing apparatus according to claim 5, wherein the determining unit rewrites a size in a vertical direction (Ysiz) of the encoding area including the embed area.

8. The image processing apparatus according to claim 1, wherein the determining unit determines an area surrounding the image as the embed area.

* * * * *